United States Patent [19]

Lee

[11] Patent Number: 5,473,381
[45] Date of Patent: Dec. 5, 1995

[54] APPARATUS FOR CONVERTING FRAME FORMAT OF A TELEVISION SIGNAL TO A DISPLAY FORMAT FOR A HIGH DEFINITION TELEVISION (HDTV) RECEIVER

[75] Inventor: Dong H. Lee, Seoul, Rep. of Korea

[73] Assignee: Goldstar Co., Ltd., Seoul, Rep. of Korea

[21] Appl. No.: 283,754

[22] Filed: Aug. 1, 1994

[30] Foreign Application Priority Data

Aug. 7, 1993 [KR] Rep. of Korea ............... 15369/1993
Aug. 7, 1993 [KR] Rep. of Korea ............... 15372/1993

[51] Int. Cl.$^6$ ................................................. H04N 7/01
[52] U.S. Cl. .................... 348/441; 348/443; 348/445; 348/446; 348/458; 348/459
[58] Field of Search ................................. 348/441, 446, 348/458, 445, 459, 443; H04N 7/01

[56] References Cited

U.S. PATENT DOCUMENTS 4,989,091  1/1991  Lucas .
5,095,354  3/1992  Sokawa et al. .
5,208,669  5/1993  Richards .

Primary Examiner—James J. Groody
Assistant Examiner—Nina N. West
Attorney, Agent, or Firm—Finnegan, Henderson, Farabow, Garrett & Dunner

[57] ABSTRACT

An apparatus for converting a frame format of a television signal to a display format includes a scanning format conversion circuit for converting a scanning format of an input video signal to a progressive scanning type if it is of an interlaced scanning type, a scanning line conversion circuit for converting the number of vertical scanning lines of an output video signal from the scanning format conversion circuit to that of the display format, a horizontal pixel conversion circuit for converting the number of horizontal pixels of an output video signal from the scanning line conversion circuit to that of the display format, and a format control circuit for controlling the scanning format conversion circuit, the scanning line conversion circuit and the horizontal pixel conversion circuit to convert a frame format of the input video signal to the display format.

65 Claims, 19 Drawing Sheets

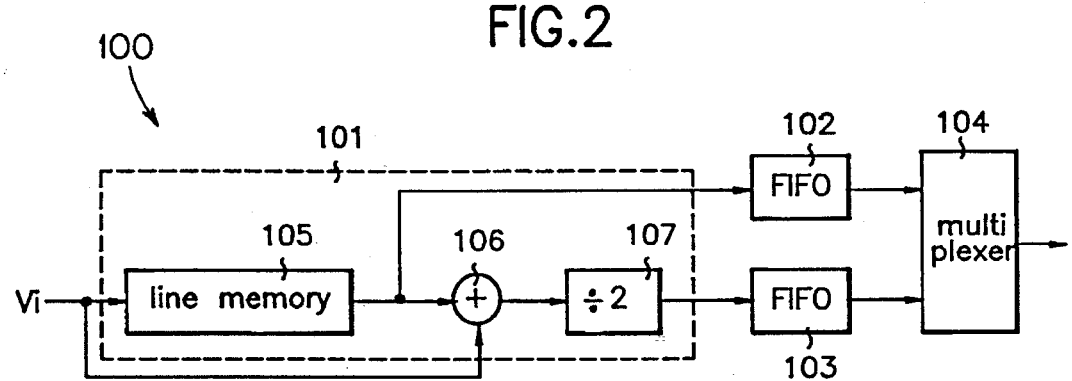
FIG.2
FIG.3a
FIG.3b
FIG.3c
FIG.3d
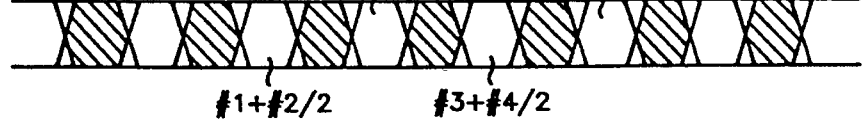
FIG.3e
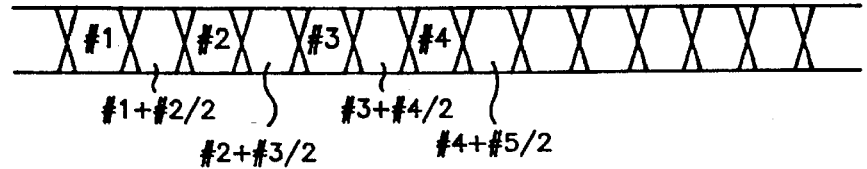
FIG.3f

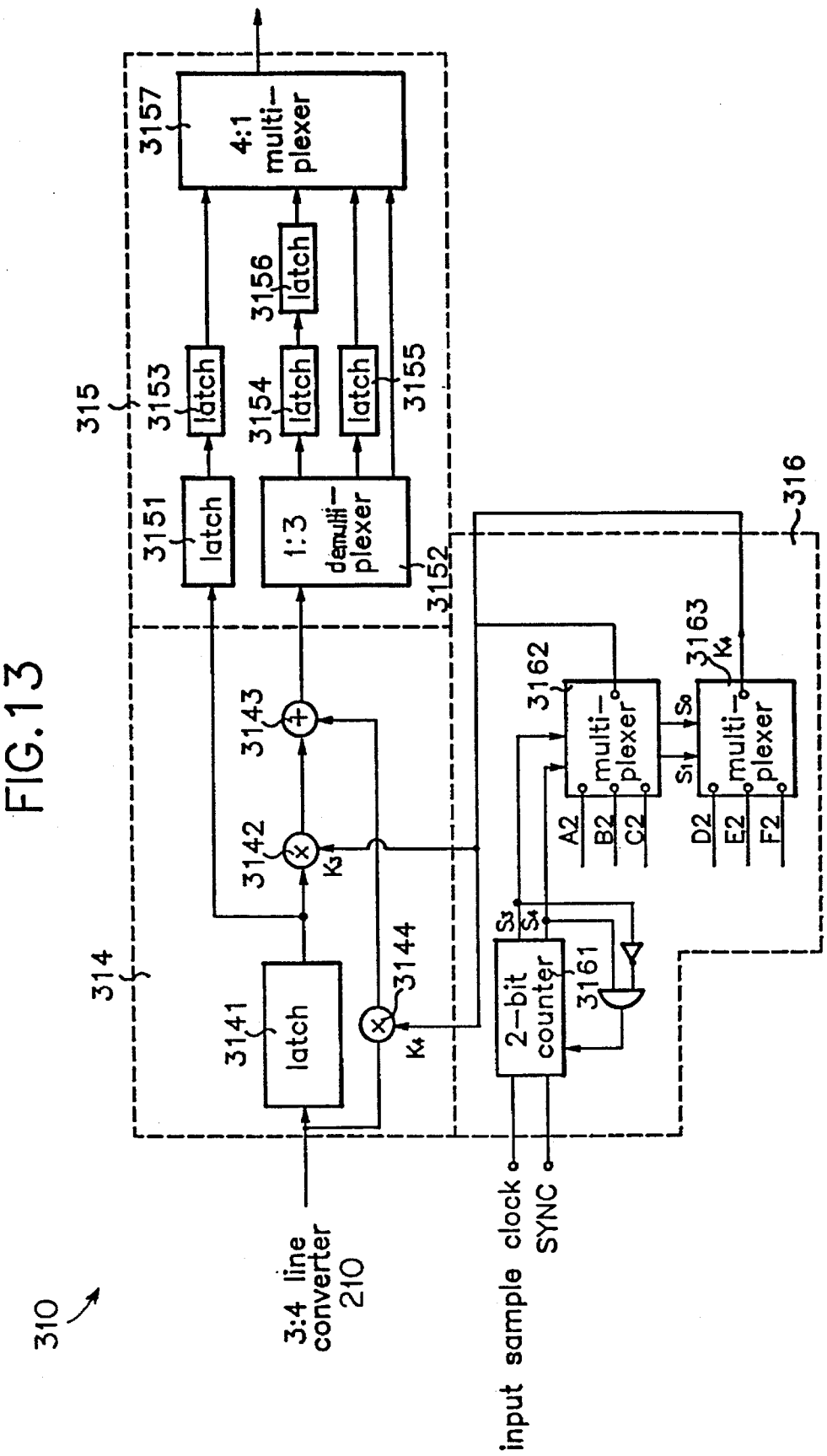

FIG.22
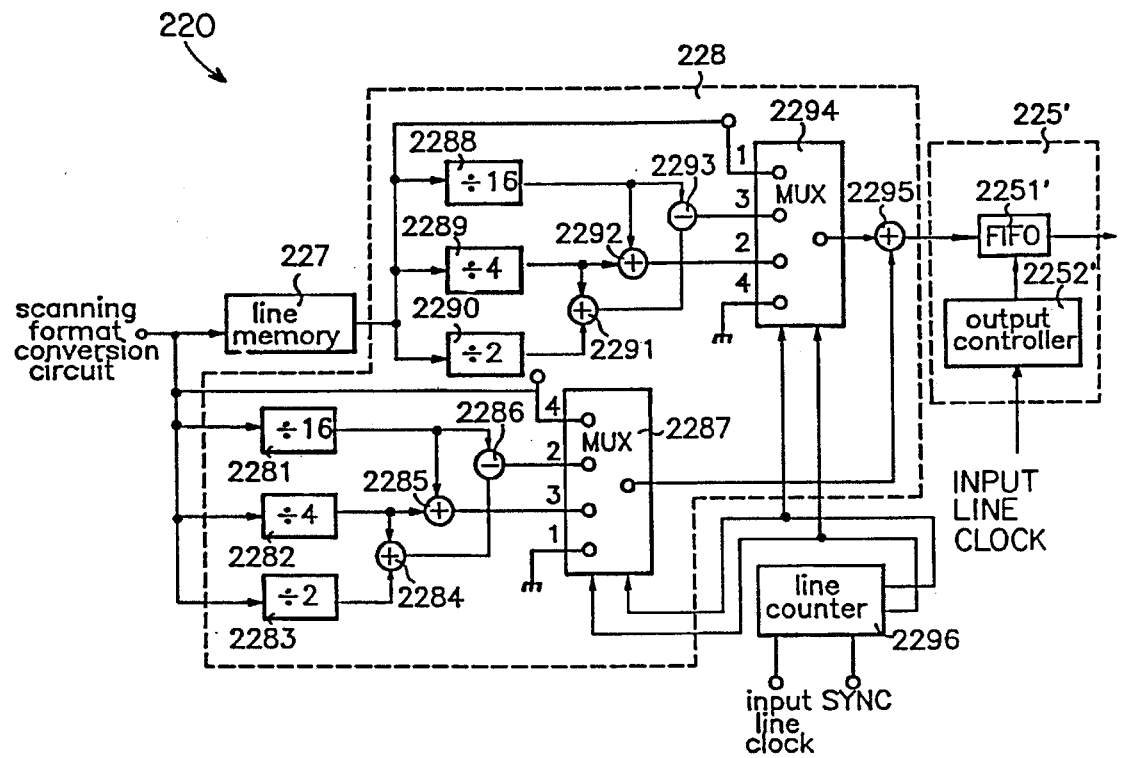
FIG.23a
FIG.23b
FIG.23c
FIG.23d
FIG.23e
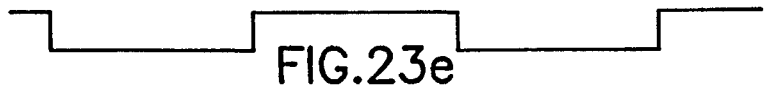
FIG.23f

APPARATUS FOR CONVERTING FRAME FORMAT OF A TELEVISION SIGNAL TO A DISPLAY FORMAT FOR A HIGH DEFINITION TELEVISION (HDTV) RECEIVER

BACKGROUND OF THE INVENTION

1. Field of the Invention

The present invention relates in general to a conversion of a frame format of a television signal to a display format, and more particularly, to an apparatus for converting a frame format of a television signal to a display format for a high definition television (HDTV) receiver.

2. Discussion of Related Art

Recently, a high definition television signal has been proposed in the United States of America to accommodate various frame formats with no limitation to a single one. The frame formats of the high definition television signal may be classified generally into (1) progressive scanning formats with 787.5 vertical scanning lines and (2) progressive and interlaced scanning formats with 1050 vertical scanning lines. For this reason, conversion must be performed among the various frame formats.

Namely, because a display format is limited to a single type depending on a characteristic of a monitor at a receiving stage, any one of the various frame formats, as mentioned above, transmitted from a broadcasting station must be converted to the display format of the monitor.

SUMMARY OF THE INVENTION

Therefore, the present invention has been made in view of the above problem, and it is an object of the present invention to provide an apparatus for converting a frame format of a television signal transmitted from a broadcasting station to a display format of a monitor without degrading the resolution of a high definition television receiver.

The features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

In accordance with the present invention, the above and other objects can be accomplished by a provision of an apparatus for converting a frame format of a television signal, comprising scanning format conversion means for converting a scanning format of an input video signal to a progressive scanning type if it is of an interlaced scanning type; scanning line conversion means for converting the number of vertical scanning lines of an output video signal from the scanning format conversion means to that of a display format, the scanning line conversion means including 3:4 line conversion means for converting the number of the vertical scanning lines of the video signal from the scanning format conversion means to 1050 lines if it is 787.5 lines, 4:3 line conversion means for converting the number of the vertical scanning lines of the video signal from the scanning format conversion means into 787.5 lines if it is 1050 lines, 2:1 line conversion means for converting the number of the vertical scanning lines of the video signal from the scanning format conversion means to 525 lines if it is 1050 lines, and 3:2 line conversion means for converting the number of the vertical scanning lines of the video signal from the scanning format conversion means into 525 lines if it is 787.5 lines; horizontal pixel conversion means for converting the number of horizontal pixels of an output video signal from the scanning line conversion means to that of the display format, the horizontal pixel conversion means including 3:4 pixel conversion means for converting the number of horizontal pixels of an output video signal from the 3:4 line conversion means in the scanning line conversion means at a ratio of 3:4, 4:3 pixel conversion means for converting the number of horizontal pixels of an output video signal from the 4:3 line conversion means in the scanning line conversion means at a ratio of 4:3, 2:1 pixel conversion means for converting the number of horizontal pixels of an output video signal from the 2:1 line conversion means in the scanning line conversion means at a ratio of 2:1, and 3:2 pixel conversion means for converting the number of horizontal pixels of an output video signal from the 3:2 line conversion means in the scanning line conversion means at a ratio of 3:2; and format control means for controlling the scanning format conversion means, the scanning line conversion means and the horizontal pixel conversion means to convert a frame format of the input video signal to the display format.

BRIEF DESCRIPTION OF THE DRAWINGS

The above and other objects, features and advantages of the present invention will be more clearly understood from the following detailed description taken in conjunction with the accompanying drawings, in which:

FIG. 2 is a detailed block diagram of a first embodiment of a scanning format conversion circuit in FIG. 1 in accordance with the present invention;

FIGS. 3A to 3F are waveform diagrams of signals from components in FIG. 2;

FIG. 13 is a detailed block diagram of a second embodiment of the 3:4 pixel converter in FIG. 1 in accordance with the present invention;

FIG. 22 is a detailed block diagram of a third embodiment of the 4:3 line converter in FIG. 1 in accordance with the present invention;

FIGS. 23A to 23F are waveform diagrams of signals from components in FIG. 22;

DETAILED DESCRIPTION OF THE PREFERRED EMBODIMENTS

Figure 1:
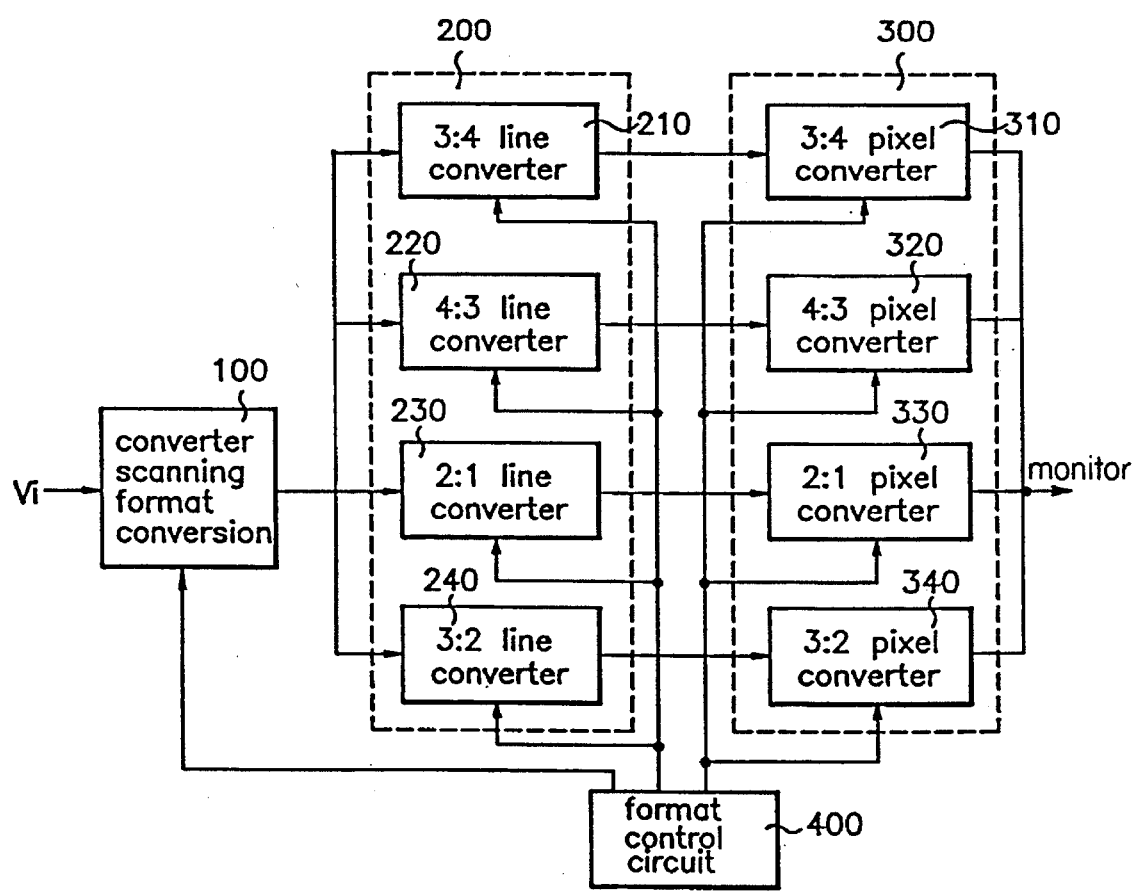
FIG. 1 is a block diagram of an apparatus for converting a frame format of a television signal in accordance with the present invention.

Referring to FIG. 1, there is shown a block diagram of an apparatus for converting a frame format of a television signal in accordance with the present invention. As shown in this drawing, the frame format conversion apparatus includes a scanning format conversion circuit 100, a scanning line conversion circuit 200, a horizontal pixel conversion circuit 300 and a format control circuit 400.

The scanning format conversion circuit 100 converts a scanning format of an input video signal Vi to a progressive scanning type under control of the format control circuit 400 if it is of an interlaced scanning type and output the video signal of the converted scanning format to the scanning line conversion circuit 200.

The scanning line conversion circuit 200 converts the number of vertical scanning lines of the video signal from the scanning format conversion circuit 100 into that of a display format of a monitor under the control of the format control circuit 400. To this end, the scanning line conversion circuit 200 includes a 3:4 line converter 210 for converting the number of the vertical scanning lines of the video signal from the scanning format conversion circuit 100 to 1050 lines under the control of the format control circuit 400 for video signals of 787.5 lines. A 4:3 line converter 220 converts the number of vertical scanning lines of the video signal from the scanning format conversion circuit 100 to 787.5 lines under the control of the format control circuit 400 for video signals of 1050 lines. A 2:1 line converter 230 converts the number of vertical scanning lines of the video signal from the scanning format conversion circuit 100 to 525 lines under the control of the format control circuit 400 for video signals of 1050 lines. A 3:2 line converter 240 converts the number of vertical scanning lines of the video signal from the scanning format conversion circuit 100 to 525 lines under the control of the format control circuit 400 for video signals of 787.5 lines.

The horizontal pixel conversion circuit 300 converts the number of horizontal pixels of an output video signal from the scanning line conversion circuit 200 to that of the display format of the monitor, under the control of the format control circuit 400. To this end, the horizontal pixel conversion circuit 300 includes a 3:4 pixel converter 310 for converting the number of horizontal pixels of an output video signal from the 3:4 line converter 210 in the scanning line conversion circuit 200 at a ratio of 3:4 under the control of the format control circuit 400. A 4:3 pixel converter 320 converts the number of horizontal pixels of an output video signal from the 4:3 line converter 220 in the scanning line conversion circuit 200 at a ratio of 4:3 under the control of the format control circuit 400. A 2:1 pixel converter 330 converts the number of horizontal pixels of an output video signal from the 2:1 line converter 230 in the scanning line conversion circuit 200 at a ratio of 2:1 under the control of the format control circuit 400. A 3:2 pixel converter 340 converts the number of horizontal pixels of an output video signal from the 3:2 line converter 240 in the scanning line conversion circuit 200 at a ratio of 3:2 under the control of the format control circuit 400.

The format control circuit 400 controls the scanning format conversion circuit 100, the 3:4 line converter 210, the 4:3 line converter 220, the 2:1 line converter 230, and the 3:2 line converter 240 in the scanning line conversion circuit 200. The circuit 400 also controls the 3:4 pixel converter 310, the 4:3 pixel converter 320, the 2:1 pixel converter 330, and the 3:2 pixel converter 340 in the horizontal pixel conversion circuit 300 to convert a frame format of the input video signal Vi to the display format of the monitor. The format control circuit 400 controls automatically the conversion of the frame format of the input video signal Vi in response to a control signal designating the frame format of the input video signal Vi, transmitted from a broadcasting station, and the display format of the monitor. Alternatively, the frame format conversion may be controlled directly by the user, as occasion demands.

The operation of the frame format conversion apparatus with the above-mentioned construction in accordance with the present invention will be described in detail.

First, the scanning format conversion circuit 100, the 3:4 line converter 210, the 4:3 line converter 220, the 2:1 line converter 230, and the 3:2 line converter 240 in the scanning line conversion circuit 200, and the 3:4 pixel converter 310, the 4:3 pixel converter 320, the 2:1 pixel converter 330, and the 3:2 pixel converter 340 in the horizontal pixel conversion circuit 300 are selectively enabled by the format control circuit 400 on the basis of the frame format of the input video signal Vi and the display format of the monitor. Then, the enabled devices are operated to convert the frame format of the input video signal Vi to the display format of the monitor and output the video signal of the converted frame format to the monitor.

In the case where the frame format of the input video signal Vi is of the progressive scanning type with the 787.5 vertical scanning lines and the display format of the monitor is of the progressive scanning type with the 1050 vertical scanning lines, the 3:4 line converter 210 and the 3:4 pixel converter 310 are enabled by the format control circuit 400 to convert the number of vertical scanning lines and the number of horizontal pixels of the input video signal Vi to those of the display format of the monitor. The video signal of the converted frame format is output to the monitor.

In the case where the frame format of the input video signal Vi is of the progressive scanning type with the 1050 vertical scanning lines and the display format of the monitor is of the progressive scanning type with the 787.5 vertical scanning lines, the 4:3 line converter 220 and the 4:3 pixel converter 320 are enabled by the format control circuit 400 to convert the number of vertical scanning lines and the number of horizontal pixels of the input video signal Vi to those of the display format of the monitor. The video signal of the converted frame format is output to the monitor.

In the case where the frame format of the input video signal Vi is of the progressive scanning type with the 1050 vertical scanning lines and the display format of the monitor is of the progressive scanning type with the 525 vertical scanning lines, the 2:1 line converter 230 and the 2:1 pixel converter 330 are enabled by the format control circuit 400 to convert the number of vertical scanning lines and the number of horizontal pixels of the input video signal Vi to those of the display format of the monitor. The video signal of the converted frame format is output to the monitor.

In the case where the frame format of the input video signal Vi is of the progressive scanning type with the 787.5 vertical scanning lines and the display format of the monitor is of the progressive scanning type with the 525 vertical scanning lines, the 3:2 line converter 240 and the 3:2 pixel converter 340 are enabled by the format control circuit 400 to convert the number of vertical scanning lines and the number of horizontal pixels of the input video signal Vi to those of the display format of the monitor. The video signal of the converted frame format is output to the monitor.

In the case where the frame format of the input video signal Vi is of the interlaced scanning type with the 1050 vertical scanning lines and the display format of the monitor is of the progressive scanning type with the 787.5 vertical scanning lines, the scanning format conversion circuit 100, the 4:3 line converter 220, and the 4:3 pixel converter 320 are enabled by the format control circuit 400 to convert the scanning format, the number of vertical scanning lines, and the number of horizontal pixels of the input video signal Vi to those of the display format of the monitor. The video signal of the converted frame format is output to the monitor.

In the case where the frame format of the input video signal Vi is of the interlaced scanning type with the 1050 vertical scanning lines and the display format of the monitor is of the progressive scanning type with the 525 vertical scanning lines, the scanning format conversion circuit 100, the 2:1 line converter 230, and the 2:1 pixel converter 330 are enabled by the format control circuit 400 to convert the scanning format, the number of vertical scanning lines, and the number of horizontal pixels of the input video signal Vi to those of the display format of the monitor. The video signal of the converted frame format is output to the monitor.

Referring to FIG. 2, there is shown a detailed block diagram of a first embodiment of the scanning format conversion circuit 100 of FIG. 1 in accordance with the present invention. As shown in this drawing, the scanning format conversion circuit 100 includes a line average calculation circuit 101 for delaying the input video signal Vi and calculating an average of pixels in the same positions of upper and lower lines of the input video signal Vi, a first-in-first-out (FIFO) memory 102 for storing temporarily the delayed video signal from the line average calculation circuit 101, an FIFO memory 103 for storing temporarily the calculated average from the line average calculation circuit 101, and a multiplexer 104 for selecting alternately output signals from the FIFO memories 102 and 103. With this construction, the scanning format conversion circuit 100 converts the interlaced scanning format to the progressive scanning format by interpolating the average of the pixels in the same positions of the upper and lower lines of the input video signal Vi into the input video signal Vi.

The line average calculation circuit 101 includes a line memory 105 for storing and delaying the input video signal Vi in the line units and outputting the delayed video signal to the FIFO memory 102, an adder 106 for adding the delayed video signal from the line memory 105 to the input video signal Vi, and a divider 107 for dividing an output signal from the adder 106 by 2 and outputting the quotient to the FIFO memory 103.

The operation of the first embodiment of the scanning format conversion circuit 100 with the above-mentioned construction in accordance with the present invention will be described in detail with reference to FIGS. 3A to 3F, which are waveform diagrams of the signals from the components in FIG. 2.

First, the input video signal Vi as shown in FIG. 3C, is stored and delayed in line units by the line memory 105 and then applied to the FIFO memory 102, a read operation of which is performed in response to an input line clock, as shown in FIG. 3A, which controls input timing of the video signal. The delayed video signal from the line memory 105 is also applied to the adder 106, which also receives the input video signal Vi directly. Then, the adder 106 adds the pixels in the same positions of the upper and lower lines of the input video signal Vi together by adding the delayed video signal from the line memory 105 to the input video signal Vi. The output signal from the adder 106 is divided by 2 by the divider 107 and then applied to the FIFO memory 103, a read operation of which is performed in response to an inverted one (FIG. 3B) of the input line clock, as shown in FIG. 3A. The output signals from the FIFO memories 102 and 103, as shown in FIGS. 3D and 3E, respectively, are alternately selected by the multiplexer 104 and then outputted, as shown in FIG. 3F.

In other words, an odd line between adjacent even lines or an even line between adjacent odd lines is interpolated with an average of the adjacent lines. Namely, every input line is interpolated with the average of the upper and lower lines. In this manner, the scanning format of the input video signal is converted from the interlaced scanning type to the progressive scanning type.

Figure 4:
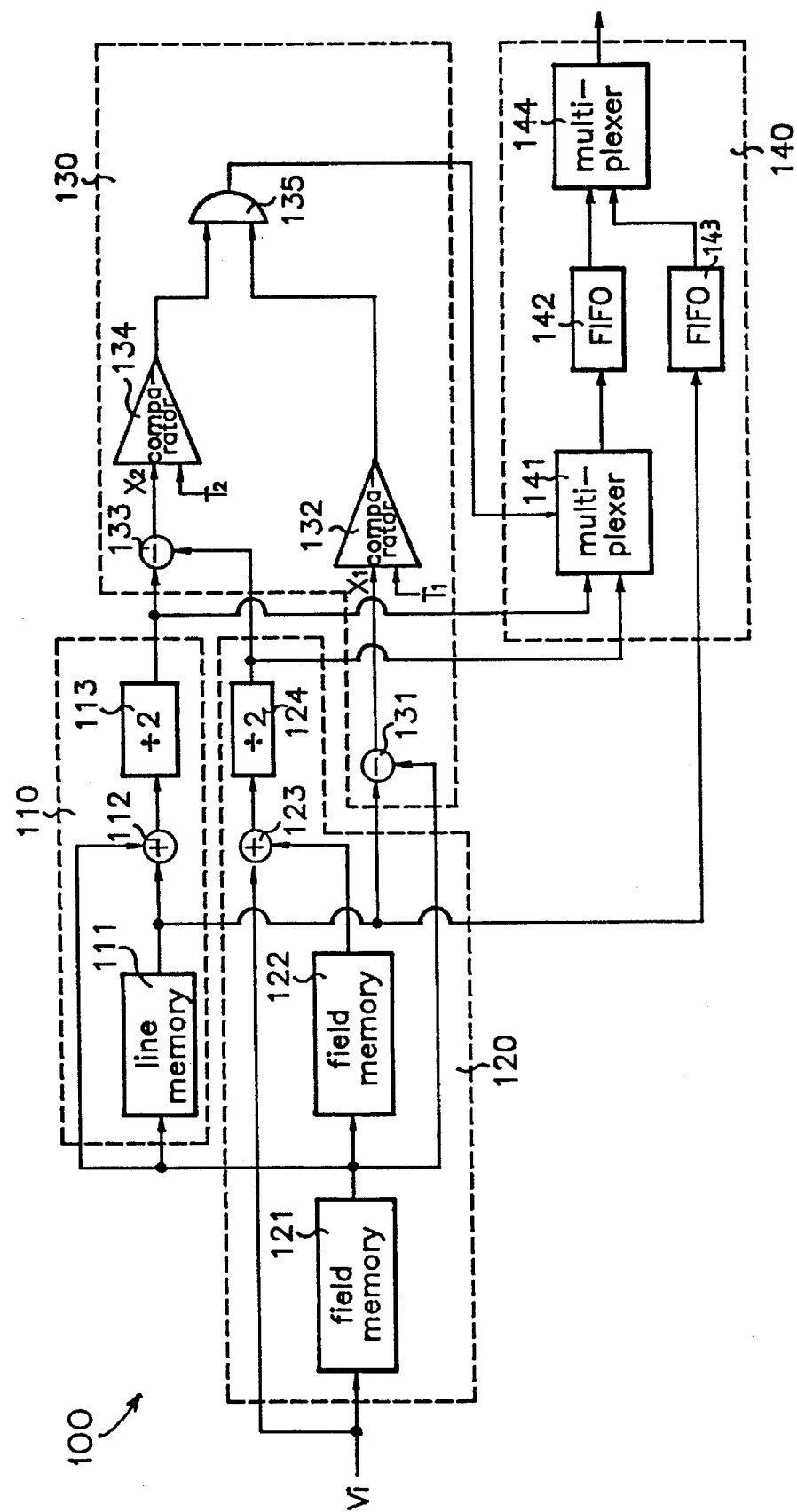
FIG. 4 is a detailed block diagram of a second embodiment of the scanning format conversion circuit in FIG. 1 in accordance with the present invention.

Referring to FIG. 4, there is shown a detailed block diagram of a second embodiment of the scanning format conversion circuit 100 of FIG. 1 in accordance with the present invention. As shown in this drawing, the scanning format conversion circuit 100 includes a line average calculation circuit 110, a frame average calculation circuit 120, a motion detection circuit 130 and an output signal selection circuit 140.

The frame average calculation circuit 120 calculates an average of pixels in the same positions of preceding and following frames of the input video signal Vi. To this end, the frame average calculation circuit 120 includes a field memory 121 for storing the input video signal Vi in field units, a field memory 122 for storing an output signal from the field memory 121 in fields units, an adder 123 for adding an output signal from the field memory 122 to the input video signal Vi, and a divider 124 for dividing an output signal from the adder 123 by 2.

The line average calculation circuit 110 calculates an average of pixels in the same positions of upper and lower lines of the input video signal Vi. To this end, the line average calculation circuit 110 includes a line memory 111 for storing and delaying the output signal from the field memory 121 in the frame average calculation circuit 120 in line units, an adder 112 for adding an output signal from the line memory 111 to the output signal from the field memory 121, and a divider 113 for dividing an output signal from the adder 112 by 2.

The motion detection circuit 130 detects a motion of the input video signal Vi in response to output signals from the frame average calculation circuit 120 and the line average calculation circuit 110. To this end, the motion detection circuit 130 includes a subtracter 131 for calculating a difference between the output signal from the field memory 121 in the frame average calculation circuit 120 and the output signal from the line memory 111 in the line average calculation circuit 110. A subtracter 133 calculates a difference between an output signal from the divider 124 in the frame average calculation circuit 120 and an output signal from the divider 113 in the line average calculation circuit 110. A comparator 132 compares an output signal from the subtracter 131 with a predetermined threshold value T1 and a comparator 134 compares an output signal from the subtracter 133 with a predetermined threshold value T2. An AND gate 135 performs a logical AND on output signals from the comparators 132 and 134.

The output signal selection circuit 140 selects one of the output signals from the frame average calculation circuit 120 and the line average calculation circuit 110 under control of the motion detection circuit 130 and outputs alternately the selected signal and the input video signal Vi. To this end, the output signal selection circuit 140 includes a multiplexer 141 for selecting either an output signal from the divider 124 in the frame average calculation circuit 120 or an output signal from the divider 113 in the line average calculation circuit 110 under control of the AND gate 135 in the motion detection circuit 130. An FIFO memory 142 stores temporarily an output signal from the multiplexer 141, an FIFO memory 143 stores temporarily the output signal from the line memory 111 in the line average calculation circuit 110, and a multiplexer 144 selects one of the output signals from the FIFO memories 142 and 143. With this construction, a portion of the input video signal Vi with a large amount of motion is interpolated with the average of the adjacent upper and lower lines, as shown in FIG. 3F, while a portion of the input video signal Vi with a small amount of motion, such as a still picture portion, is interpolated with the average of the pixels in the same positions of the frames preceding and following about a time axis or the pixels in the same positions of the preceding frame. As a result, a blurring effect is removed.

Figure 5:
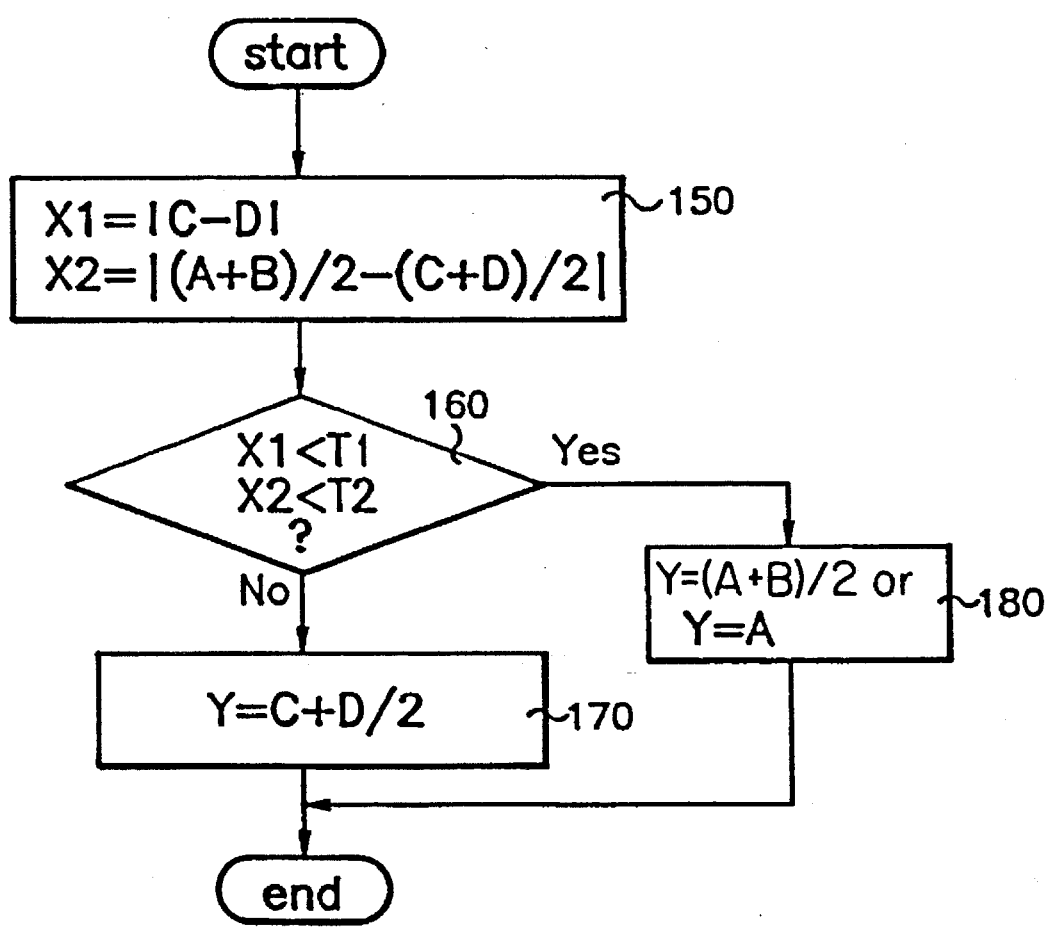
FIG. 5 is a flowchart illustrating an operation of the scanning format conversion circuit in FIG. 4 in accordance with the present invention.

The operation of the second embodiment of the scanning format conversion circuit 100 with the above-mentioned construction in accordance with the present invention will be described in detail with reference to FIG. 5, which is a flowchart illustrating the operation of the scanning format conversion circuit 100 in FIG. 4.

First, in the frame average calculation circuit 120, the input video signal Vi is sequentially stored in field units by the field memories 121 and 122 and then applied to the adder 123, which also receives the input video signal Vi directly. The adder 123 adds the output signal from the field memory 122 to the input video signal Vi. Then, the divider 124 obtains the average (|A+B|/2) of the pixels in the same positions of the preceding and following frames of the input video signal Vi by dividing the output signal from the adder 123 by 2. The output signal from the field memory 121 is also applied to the line average calculation circuit 110.

In the line average calculation circuit 110, the output signal from the field memory 121 is stored in line units by the line memory 111 and then applied to the adder 112, which also receives the output signal from the field memory 121 directly. The adder 112 adds the output signal from the line memory 111 to the output signal from the field memory 121. Then, the divider 113 obtains the average (|C+D|/2) of the pixels in the same positions of the upper and lower lines of the input video signal Vi by dividing the output signal from the adder 112 by 2.

Then, in the motion detection circuit 130, the subtracter 133 calculates the difference X2 between the average (|A+B|/2) from the divider 124 in the frame average calculation circuit 120 and the average (|C+D|/2) from the divider 113 in the line average calculation circuit 110 at step 150. Namely, $$X2=|(A+B)/2-(C+D)/2|$$

Also at step 150, the subtracter 131 calculates the difference X1 between the output signal from the field memory 121 in the frame average calculation circuit 120 and the output signal from the line memory 111 in the line average calculation circuit 110, i.e., the difference between the pixels in the same positions of the adjacent upper and lower lines of the input video signal Vi. Namely, $$X1=|C-D|$$

At step 160, the calculated differences X1 and X2 from the subtracters 131 and 133 are compared to the predetermined threshold values TI and T2 by the comparators 132 and 134, respectively. Then, the compared results from the comparators 132 and 134 are applied to the AND gate 135. That is, it is determined at step 160 whether the difference X1 from the subtracter 131 is smaller than the predetermined threshold value T1. It is also determined at step 160 whether the difference X2 from the subtracter 133 is smaller than the predetermined threshold value T2.

If it is determined at step 160 that the difference X1 from the subtracter 131 is smaller than the predetermined threshold value T1 and the difference X2 from the subtracter 133 is smaller than the predetermined threshold value T2, the present video portion is determined to be a still portion. As a result, the present video portion is interpolated with the average (|A+B|/2) of the pixels in the same positions of the preceding and following frames or the pixel A in the same position of the preceding frame at step 180.

If it is determined at step 160 that the difference X1 from the subtracter 131 is not smaller than the predetermined threshold value T1 or the difference X2 from the subtracter 133 is not smaller than the predetermined threshold value T2, the present video portion is determined to be a motion portion. As a result, the present video portion is interpolated with the average (|C+D|/2) of the pixels in the same positions of the upper and lower lines at step 170.

Then, in the output signal selection circuit 140, the multiplexer 141 operates in response to the output signal from the AND gate 135 in the motion detection circuit 130 to select either the output signal from the divider 124 (the average (|A+B|/2) of the pixels in the same positions of the preceding and following frames) or the output signal from the divider 113 (the average (|C+D|/2) of the pixels in the same positions of the upper and lower lines). The output signal from the multiplexer 141 is temporarily stored in the FIFO memory 142 and the output signal from the line memory 111 is temporarily stored in the FIFO memory 143. Then, the multiplexer 144 selects alternately the output signals from the FIFO memories 142 and 143. In this manner, the scanning format of the input video signal is converted from the interlaced scanning type to the progressive scanning type.

Figure 6:
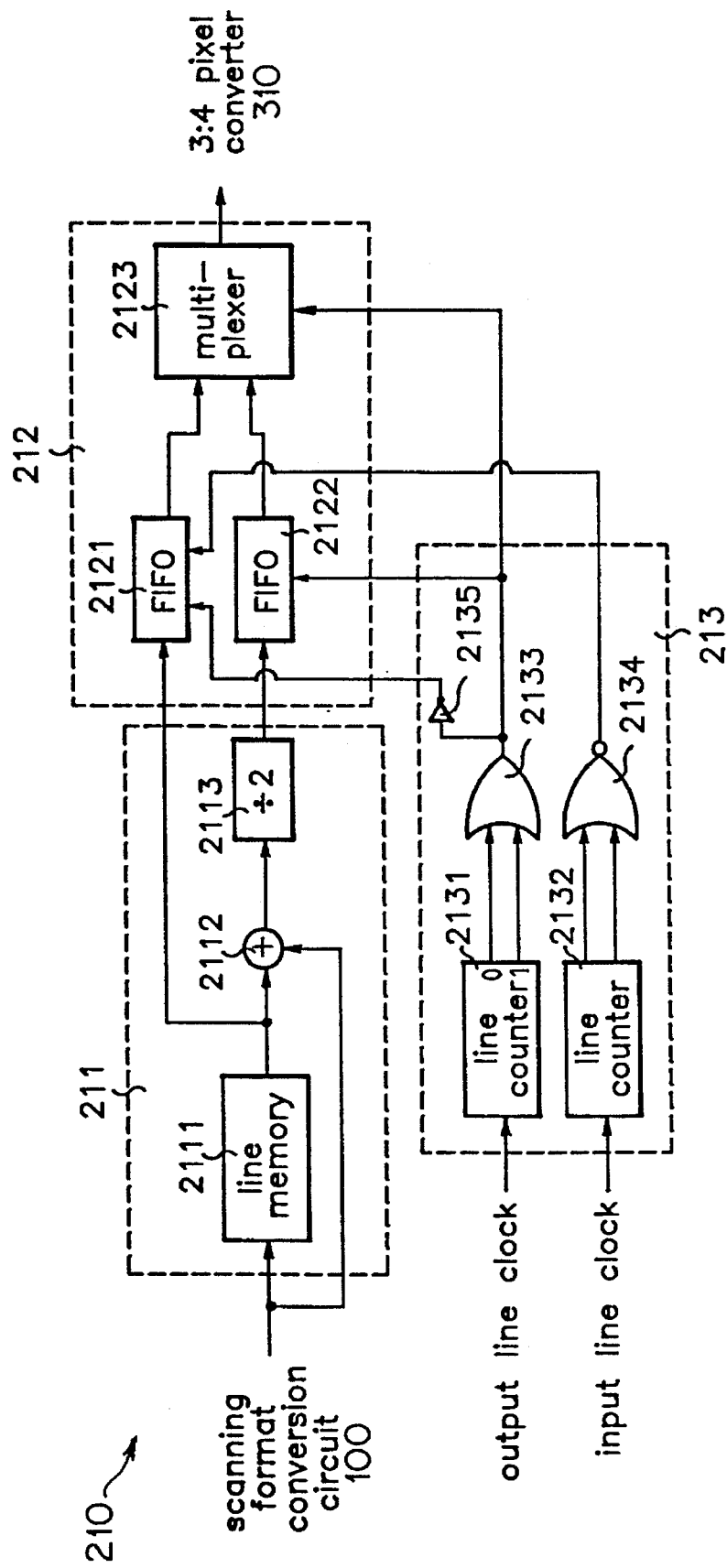
FIG. 6 is a detailed block diagram of a first embodiment of a 3:4 line converter in FIG. 1 in accordance with the present invention.

Referring to FIG. 6, there is shown a detailed block diagram of a first embodiment of the 3:4 line converter 210 of FIG. 1 in accordance with the present invention. As shown in this drawing, the 3:4 line converter 210 includes a filtering circuit 211, a signal output circuit 212, and an output controller 213.

The filtering circuit 211 delays and filters the video signal from the scanning format conversion circuit 100. To this end, the filtering circuit 211 includes a line memory 2111 for storing and delaying the video signal from the scanning format conversion circuit 100 in line units and outputting the delayed video signal to the signal output circuit 212, an adder 2112 for adding an output signal from the line memory 2111 to the video signal from the scanning format conversion circuit 100, and a divider 2113 for dividing an output signal from the adder 2112 by 2 to obtain an average of pixels in the same positions of adjacent lines of the video signal from the scanning format conversion circuit 100. The divided signal is output to the signal output circuit 212.

The signal output circuit 212 selects one of a plurality of output signals from the filtering circuit 211 and outputs the selected signal to the 3:4 pixel converter 310. To this end, the signal output circuit 212 includes an FIFO memory 2121 for storing temporarily the output signal from the line memory 2111 in the filtering circuit 211, an FIFO memory 2122 for storing temporarily an output signal from the divider 2113 in the filtering circuit 211, and a multiplexer 2123 for selecting one of output signals from the FIFO memories 2121 and 2122.

The output controller 213 controls the signal output circuit 212 in response to input/output line clocks for controlling input/output timing of the video signal. To this end, the output controller 213 includes a line counter 2131 for counting the output line clock in 2 bit units, a line counter 2132 for counting the input line clock in 2 bit units, an OR gate 2133 for ORing two output bits from the line counter 2131 and outputting the ORed signal to the FIFO memory 2122 and the multiplexer 2123 in the signal output circuit 212, a NOR gate 2134 for NORing two output bits from the line counter 2132 and outputting the NORed signal to the FIFO memory 2121 in the signal output circuit 212, and a NOT gate or an inverter 2135 for inverting an output signal from the OR gate 2133 and outputting the inverted signal to the FIFO memory 2121 in the signal output circuit 212.

The operation of the first embodiment of the 3:4 line converter 210 with the above-mentioned construction in accordance with the present invention will be described in detail with reference to FIGS. 7A to 7E, which are waveform diagrams of the signals from the components in FIG. 6.

First, in the filtering circuit 211, the video signal from the scanning format conversion circuit 100 is stored and delayed in line units by the line memory 2111 and then applied to the adder 2112, which also receives the video signal from the scanning format conversion circuit 100 directly. The adder 2112 adds the output signal from the line memory 2111 to the video signal from the scanning format conversion circuit 100. Then, the divider 2113 obtains the average of the pixels in the same positions of the adjacent lines of the video signal from the scanning format conversion circuit 100 by dividing the output signal from the adder 2112 by 2. The output signals from the line memory 2111 and the divider 2113 are temporarily stored in the FIFO memories 2121 and 2122 in the signal output circuit 212, respectively.

Figure 7A:
FIGS. 7A to 7E are waveform diagrams of signals from components in FIG. 6.
Figure 7B:

In the output controller 213, the output line clock, as shown in FIG. 7A, is counted in 2 bit units by the line counter 2131. The two output bits from the line counter 2131 are ORed by the OR gate 2133, which thus outputs the ORed signal, as shown in FIG. 7E. In response to the output signal from the OR gate 2133, a read operation of the FIFO memory 2122 in the signal output circuit 212 and the operation of the multiplexer 2123 therein are controlled. Also, the output signal from the OR gate 2133 is inverted, as shown in FIG. 7D, by the NOT gate 2135 and then applied to the FIFO memory 2121 in the signal output circuit 212 for controlling a read operation thereof. On the other hand, the input line clock, as shown in FIG. 7B, is counted in 2 bit units by the line counter 2132. The two output bits from the line counter 2132 are NORed by the NOR gate 2134, which thus outputs the NORed signal, as shown in FIG. 7C, to the FIFO memory 2121 in the signal output circuit 212 for controlling a write operation thereof.

Figure 7C:
Figure 7D:
Figure 7E:

The output signals from the NOR gate 2134, the NOT gate 2135, and the OR gate 2133, as shown in FIGS. 7C, 7D and 7E, are adapted to control the FIFO memories 2121 and 2122 and the multiplexer 2123, thereby causing the number of the vertical scanning lines to be converted from 787.5 to 1050. Namely, only a first one of successive three lines of the video signal from the line memory 2111 is written into the FIFO memory 2121 in response to the output signal from the NOT gate, as shown in FIG. 7C and 7D. Also, the first line stored in the FIFO memory 2121 and the pixel average stored in the FIFO memory 2122 are alternately read according to the output timing based on the output signals from the NOT gate 2135 and the OR gate 2133, as shown in FIGS. 7D and 7E.

Subsequently, the signal which is outputted from the multiplexer 2123 in response to the output signal from the OR gate 2133, as shown in FIG. 7E, consists of four lines, the first line from the FIFO memory 2121 and successive three lines of the pixel average from the FIFO memory 2122. Therefore, the number of the vertical scanning lines is converted from 787.5 to 1050. In other words, sequentially outputted from the multiplexer 2123 are the first input line, the average of the pixels in the same positions of the first and second input lines, the average of the pixels in the same positions of the second and third input lines, and the average of the pixels in the same positions of the third and fourth input lines.

Figure 8:
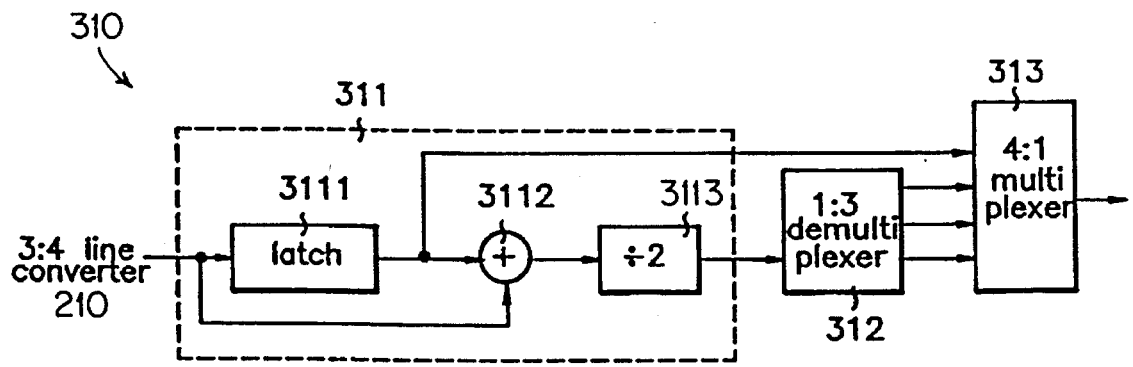
FIG. 8 is a detailed block diagram of a first embodiment of a 3:4 pixel converter in FIG. 1 in accordance with the present invention.

Referring to FIG. 8, there is shown a detailed block diagram of a first embodiment of the 3:4 pixel converter 310 of FIG. 1 in accordance with the present invention. As shown in this drawing, the 3:4 pixel converter 310 includes a filtering circuit 311 for delaying and filtering the video signal from the 3:4 line converter 210, a 1:3 demultiplexer 312 for 1:3-demultiplexing the filtered video signal from the filtering circuit 311, and a 4:1 multiplexer 313 for 4:1-multiplexing the delayed video signal from the filtering circuit 311 and output signals from the 1:3 demultiplexer 312.

The filtering circuit 311 includes a latch 3111 for storing and delaying the video signal from the 3:4 line converter 210 in pixel units and outputting the delayed video signal to the 4:1 multiplexer 313, an adder 3112 for adding an output signal from the latch 3111 to the video signal from the 3:4 line converter 210, and a divider 3113 for dividing an output signal from the adder 3112 by 2 to obtain an average of adjacent pixels of the video signal from the 3:4 line converter 210. The divided signal is output to the 1:3 demultiplexer 312.

In operation, the video signal from the 3:4 line converter 210 is stored and delayed in pixel units by the latch 3111 and then applied to the adder 3112, which also receives the video signal from the 3:4 line converter 210 directly. The adder 3112 adds the output signal from the latch 3111 to the video signal from the 3:4 line converter 210. Then, the divider 3113 obtains the average of the adjacent pixels, or left and right pixels, of the video signal from the 3:4 line converter 210 by dividing the output signal from the adder 3112 by 2. The pixel average from the divider 3113 is 1:3-demultiplexed by the 1:3 demultiplexer 312 and then applied to the 4:1 multiplexer 313, which also receives the output signal from the latch 3111. Then, the 4:1 multiplexer 313 selects alternately the output signal from the latch 3111 and the three output signals from the 1:3 demultiplexer 312. As a result, the number of pixels per line is converted at the ratio of 3:4.

Namely, sequentially outputted from the 4:1 multiplexer 313 are the first input pixel, the average of the first and second input pixels, the average of the second and third input pixels, and the average of the third and fourth input pixels.

Figure 9:
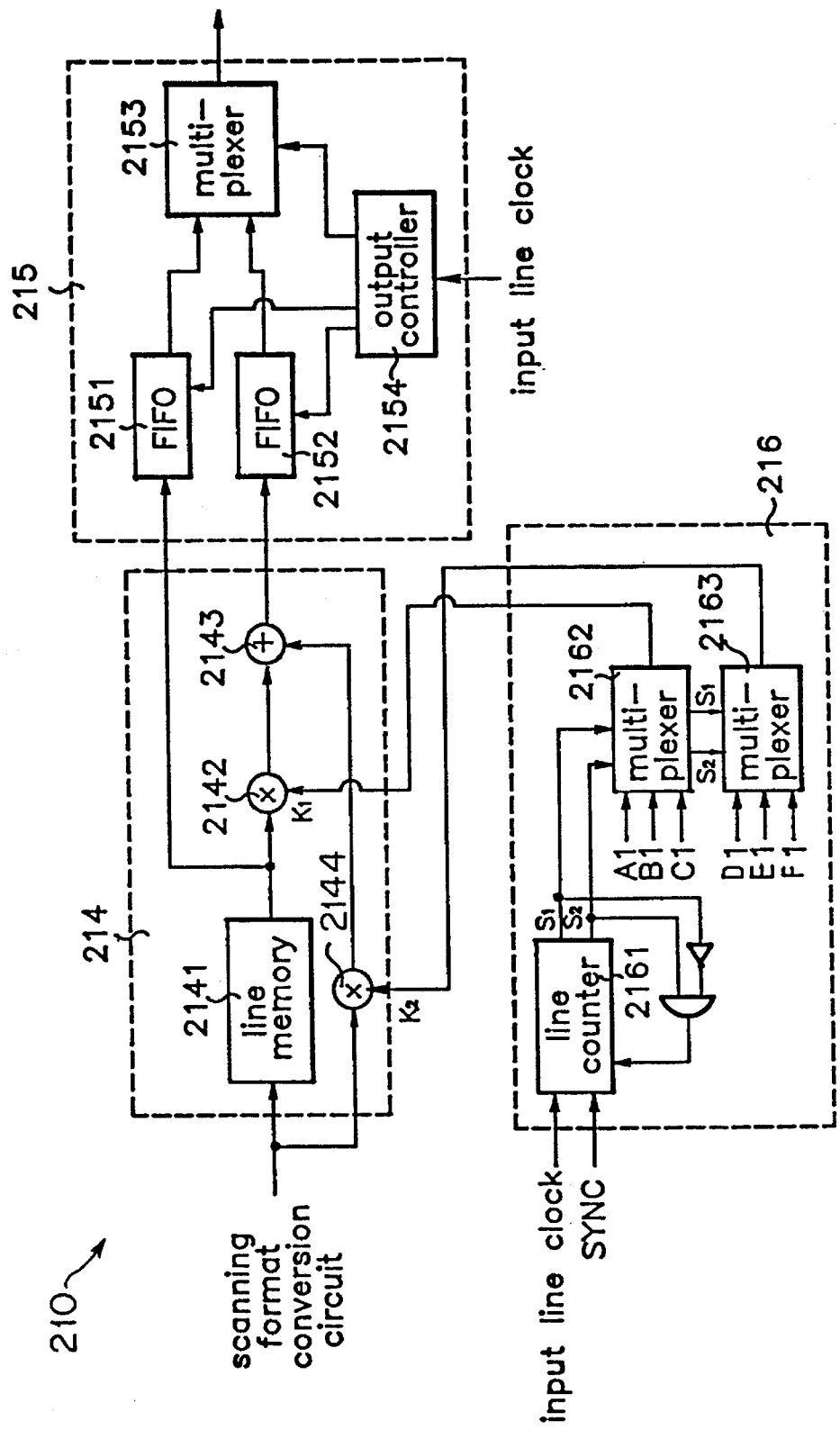
FIG. 9 is a detailed block diagram of a second embodiment of the 3:4 line converter in FIG. 1 in accordance with the present invention.

Referring to FIG. 9, there is shown a detailed block diagram of a second embodiment of the 3:4 line converter 210 of FIG. 1 in accordance with the present invention. As shown in this drawing, the 3:4 line converter 210 includes a coefficient generation circuit 216, a filtering circuit 214, and a signal output circuit 215.

The coefficient generation circuit 216 generates two filtering coefficients K1 and K2 in response to an input line clock for controlling input timing of the video signal and a synchronous signal, SYNC. To this end, the coefficient generation circuit 216 includes a line counter 2161 for counting the input line clock in 2 bit units in response to the synchronous signal, a multiplexer 2162 for selecting one of three input coefficients A1, B1 and C1 in response to two output bits S1 and S2 from the line counter 2161 and outputting the selected input coefficient as the filtering coefficient K1 to the filtering circuit 214, and a multiplexer 2163 for selecting one of three input coefficients D1, E1 and F1 in response to the two output bits S1 and S2 from the line counter 2161 and outputting the selected input coefficient as the filtering coefficient K2 to the filtering circuit 214.

The filtering circuit 214 filters the video signal from the scanning format conversion circuit 100 using a weighted average in consideration of a relative position of an output line with respect to an input line in response to the filtering coefficients K1 and K2 from the coefficient generation circuit 216. To this end, the filtering circuit 214 includes a line memory 2141 for storing and delaying the video signal from the scanning format conversion circuit 100 in line units, a multiplier 2142 for multiplying an output signal from the line memory 2141 by the filtering coefficient K1 from the multiplexer 2162 in the coefficient generation circuit 216, a multiplier 2144 for multiplying the video signal from the scanning format conversion circuit 100 by the filtering coefficient K2 from the multiplexer 2163 in the coefficient generation circuit 216, and an adder 2143 for adding output signals from the multipliers 2142 and 2144. The added signal is output to the signal output circuit 215.

The signal output circuit 215 selectively outputs a plurality of output signals from the filtering circuit 214. To this end, the signal output circuit 215 includes an FIFO memory 2151 for storing temporarily the output signal from the line memory 2141 in the filtering circuit 214, an FIFO memory 2152 for storing temporarily an output signal from the adder 2143 in the filtering circuit 214, a multiplexer 2153 for selecting one of output signals from the FIFO memories 2151 and 2152, and an output controller 2154 for controlling the FIFO memories 2151 and 2152 and the multiplexer 2153 in response to the input line clock.

The operation of the second embodiment of the 3:4 line converter 210 with the above-mentioned construction in accordance with the present invention will be described in detail.

First, in the coefficient generation circuit 216, the input line clock controlling the input timing of the video signal is counted in 2 bit units by the line counter 2161 in response to the synchronous signal, SYNC. The two output bits S1 and S2 from the line counter 2161 are applied to the multiplexer 2162, thereby causing the multiplexer 2162 to select one of the input coefficients A1, B1 and C1 and output the selected coefficient as the filtering coefficient K1 to the multiplier 2142 in the filtering circuit 214. The two output bits S1 and S2 from the line counter 2161 are also applied to the multiplexer 2163, thereby causing the multiplexer 2163 to select one of the input coefficients D1, E1 and F1 and output the selected coefficient as the filtering coefficient K2 to the multiplier 2144 in the filtering circuit 214.

Noticeably, the sum of the filtering coefficients K1 and K2 from the multiplexers 2162 and 2163 always becomes "1". Namely, at a period of three lines, the filtering coefficient K1 becomes sequentially 0.25, 0.5 and 0.25, while the filtering coefficient K2 becomes sequentially 0.75, 0.5 and 0.25, resulting in insertion of the first input line in three line units. To this end, upon the input of three of the input line clocks, that is, before the input of the fourth line after the input of the three lines, the line counter 2161 is reset, thereby allowing the multiplexers 2162 and 2163 to sequentially select the input coefficients A1, B1 and C1, and D1, E1 and F1 in three line units.

In the filtering circuit 214, the video signal from the scanning format conversion circuit 100 is multiplied by the filtering coefficient K2 from the multiplexer 2163 by the multiplier 2144 and then applied to the adder 2143. Also, the video signal from the scanning format conversion circuit 100 is stored and delayed in line units by the line memory 2141, multiplied by the filtering coefficient K1 from the multiplexer 2162 by the multiplier 2142 and then applied to the adder 2143.

The adder 2143 obtains the weighted average in consideration of the relative position of the output line with respect to the input line by adding the output signals from the multipliers 2142 and 2144. Then, in the signal output circuit 215, the output signal from the line memory 2141 is temporarily stored in the FIFO memory 2151 and the output signal from the adder 2143 is temporarily stored in the FIFO memory 2152 under the control of the output controller 2154. As a result, the multiplexer 2153 operates under the control of the output controller 2154 to output sequentially the first input line from the FIFO memory 2151, the weighted average of the first and second input lines from the FIFO memory 2152, the weighted average of the second and third input lines from the FIFO memory 2152, and the weighted average of the third and first input lines from the FIFO memory 2152.

Figure 10:
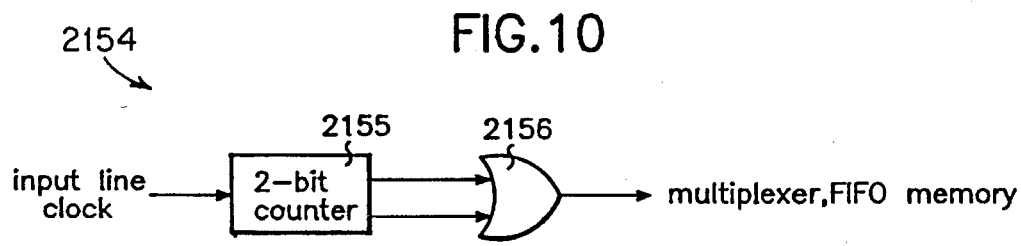
FIG. 10 is a detailed block diagram of an output controller in FIG. 9.

Referring to FIG. 10, there is shown a detailed block diagram of the output controller 2154 of FIG. 9. As shown in this drawing, the output controller 2154 includes a 2-bit counter 2155 for counting the input line clock in 2 bit units, and an OR gate 156 for ORing two output bits from the 2-bit counter 2155.

In operation, the input line clock is counted in 2 bit units by the 2-bit counter 2155. The two output bits from the 2-bit counter 2155 are ORed by the OR gate 2156 and then applied to the FIFO memories 2151 and 2152 and the multiplexer 2153 to control them.

Figure 11:
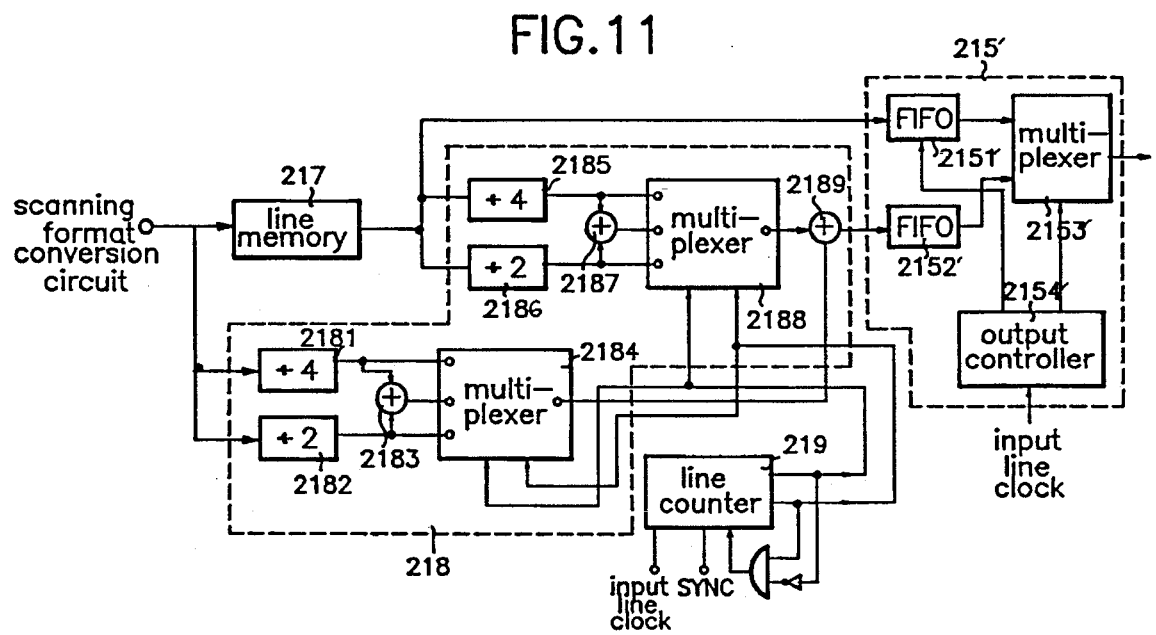
FIG. 11 is a detailed block diagram of a third embodiment of the 3:4 line converter in FIG. 1 in accordance with the present invention.

Referring to FIG. 11, there is shown a detailed block diagram of a third embodiment of the 3:4 line converter 210 of FIG. 1 in accordance with the present invention. As shown in this drawing, the 3:4 line converter 210 includes a line memory 217, a weighted average calculation circuit 218, a line counter 219 and a signal output circuit 215'.

The line memory 217 stores and delays the video signal from the scanning format conversion circuit 100 in line units.

The weighted average calculation circuit 218 calculates a weighted average in consideration of a relative position of an output line with respect to an input line in response to the video signal from the scanning format conversion circuit 100 and an output signal from the line memory 217. To this end, the weighted average calculation circuit 218 includes a 4-divider 2181 for dividing the video signal from the scanning format conversion circuit 100 by 4, a 2-divider 2182 for dividing the video signal from the scanning format conversion circuit 100 by 2, an adder 2183 for adding output signals from the 4-divider 2181 and the 2-divider 2182, a multiplexer 2184 for selecting one of the output signals from the 4-divider 2181, the 2-divider 2182, and the adder 2183 under control of the line counter 219. The circuit 218 includes a 4-divider 2185 for dividing the output signal from the line memory 217 by 4, a 2-divider 2186 for dividing the output signal from the line memory 217 by 2, an adder 2187 for adding output signals from the 4-divider 2185 and the 2-divider 2186, a multiplexer 2188 for selecting one of the output signals from the 4-divider 2185, the 2-divider 2186, and the adder 2187 under the control of the line counter 219. The circuit 218 also includes an adder 2189 for adding output signals from the multiplexers 2184 and 2188 and outputting the added signal to the signal output circuit 215'.

The line counter 219 counts an input line clock for controlling input timing of the video signal in 2 bit units in response to a synchronous signal, SYNC, and controls the multiplexers 2184 and 2188 in the weighted average calculation circuit 218 in accordance with the counted result. The line counter 219 is reset upon inputting three of the input line clocks.

The signal output circuit 215' has the same construction and operation as those of the signal output circuit 215 in FIG. 9. Namely, the signal output circuit 215' selectively outputs the output signal from the line memory 217 and an output signal from the weighted average calculation circuit 218. To this end, the signal output circuit 215' includes an FIFO memory 2151' for storing temporarily the output signal from the line memory 217, an FIFO memory 2152' for storing temporarily an output signal from the adder 2189 in the weighted average calculation circuit 218, a multiplexer 2153' for selecting one of output signals from the FIFO memories 2151' and 2152', and an output controller 2154' for controlling the FIFO memories 2151' and 2152' and the multiplexer 2153' in response to the input line clock. Also, the output controller 2154' has the same construction and operation as those of the output controller 2154 in FIG. 10 and details thereof will thus be omitted.

The operation of the third embodiment of the 3:4 line converter 210 with the above-mentioned construction in accordance with the present invention will be described in detail with reference to FIGS. 12A to 12F, which are waveform diagrams of the signals from the components in FIG. 11.

Figure 12A:
FIGS. 12A to 12F are waveform diagrams of signals from components in FIG. 11.
Figure 12B:
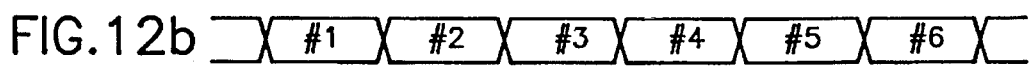

First, in the weighted average calculation circuit 218, the video signal from the scanning format conversion circuit 100, as shown in FIG. 12B, is divided by 4 by the 4-divider 2181 and also divided by 2 by the 2-divider 2182. The output signals from the 4-divider 2181 and the 2-divider 2182 are added by the adder 2183 and then applied to the multiplexer 2184.

Also, the video signal from the scanning format conversion circuit 100, as shown in FIG. 12B, is stored and delayed in line units by the line memory 217 and then applied to the weighted average calculation circuit 218. Then, in the weighted average calculation circuit 218, the output signal from the line memory 17 is divided by 4 by the 4-divider 2185 and also divided by 2 by the 2-divider 2186. The output signals from the 4-divider 2185 and the 2-divider 2186 are added by the adder 2187 and then applied to the multiplexer 2188.

Figure 12C:
Figure 12D:
Figure 12E:
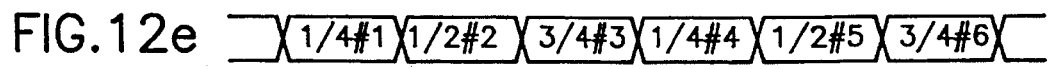
Figure 12F:
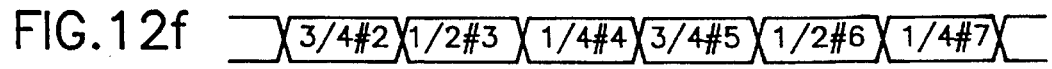

Under the control of the line counter 219, the multiplexers 2184 and 2188 sequentially select the output signals from the 4-divider 2181 and the adder 2187, the output signals from the 2-divider 2182 and the 2-divider 2186, and the output signals from the adder 2183 and the 4-divider 2185 to the adder 2189, as shown in FIGS. 12F and 12E. Namely, the output signal from the 4-divider 2181 is the same as the result obtained by multiplying the video signal from the scanning format conversion circuit 100 by a filtering coefficient of 0.25. The output signal from the 2-divider 2182 is the same as the result obtained by multiplying the video signal from the scanning format conversion circuit 100 by a filtering coefficient of 0.5. The output signal from the adder 2183 is the same as the result obtained by multiplying the video signal from the scanning format conversion circuit 100 by a filtering coefficient of 0.75. The output signal from the 4-divider 2185 is the same as the result obtained by multiplying the next line of the video signal from the line memory 217 by the filtering coefficient of 0.25. The output signal from the 2-divider 2186 is the same as the result obtained by multiplying the next line of the video signal from the line memory 217 by the filtering coefficient of 0.5. The output signal from the adder 2187 is the same as the result obtained by multiplying the next line of the video signal from the line memory 217 by the filtering coefficient of 0.75.

Therefore, the weighted average in consideration of the relative position of the output line with respect to the input line is obtained in such a manner that the signals making the sum of the filtering coefficients "1" are selected by the multiplexers 2184 and 2188 and then added by the adder 2189 under the control of the line counter 219.

On the other hand, the input line clock, as shown in FIG. 12A, is counted in 2 bit units by the line counter 219 in response to the synchronous signal, SYNC. The two output bits from the line counter 219, as shown in FIGS. 12C and 12D, are applied to the multiplexers 2184 and 2188 in the weighted average calculation circuit 218, thereby causing the multiplexers 2184 and 2188 to select the output signals from the 4-dividers 2181 and 2185, the 2-dividers 2182 and 2186, and the adders 2183 and 2187 in the weighted average calculation circuit 218 to make the sum of the filtering coefficients "1". In other words, under the control of the two output bits from the line counter 219, as shown in FIGS. 12C and 12D, the multiplexer 2184 selects alternately the output signals from the 4-divider 2181, the 2-divider 2182, and the adder 2183 at a period of three lines and the multiplexer 2188 selects alternately the output signals from the 4-divider 2185, the 2-divider 2186, and the adder 2187 at the period of the three lines.

As a result, the multiplexer 2153' operates under the control of the output controller 2154' to output sequentially the first input line from the FIFO memory 2151', the weighted average of the first and second input lines from the FIFO memory 2152', the weighted average of the second and third input lines from the FIFO memory 2152', and the weighted average of the third and first input lines from the FIFO memory 2152'.

Referring to FIG. 13, there is shown a detailed block diagram of a second embodiment of the 3:4 pixel converter 310 of FIG. 1 in accordance with the present invention. As shown in this drawing, the 3:4 pixel converter 310 includes a coefficient generation circuit 316, a filtering circuit 314 and a signal output circuit 315.

The coefficient generation circuit 316 generates two filtering coefficients K3 and K4 in response to an input sample clock for controlling input timing of the video signal and a synchronous signal, SYNC. To this end, the coefficient generation circuit 316 includes a 2-bit counter 3161 for counting the input sample clock in 2 bit units in response to the synchronous signal, a multiplexer 3162 for selecting one of three input coefficients A2, B2 and C2 in response to two output bits S3 and S4 from the 2-bit counter 3161 and outputting the selected input coefficient as the filtering coefficient K3 to the filtering circuit 314, and a multiplexer 3163 for selecting one of three input coefficients D2, E2 and F2 in response to the two output bits S3 and S4 from the 2-bit counter 3161 and outputting the selected input coefficient as the filtering coefficient K4 to the filtering circuit 314.

The filtering circuit 314 filters the video signal from the 3:4 line converter 210 using a weighted average in consideration of a relative position of an output pixel with respect to an input pixel in response to the filtering coefficients K3 and K4 from the coefficient generation circuit 316. To this end, the filtering circuit 314 includes a latch 3141 for storing and delaying the video signal from the 3:4 line converter 210 in pixel units, a multiplier 3142 for multiplying an output signal from the latch 3141 by the filtering coefficient K3 from the multiplexer 3162 in the coefficient generation circuit 316, a multiplier 3144 for multiplying the video signal from the 3:4 line converter 210 by the filtering coefficient K4 from the multiplexer 3163 in the coefficient generation circuit 316, and an adder 3143 for adding output signals from the multipliers 3142 and 3144. The added signal is output to the signal output circuit 315.

The signal output circuit 315 selects one of a plurality of output signals from the filtering circuit 314. To this end, the signal output circuit 315 includes a latch 3151 for storing temporarily and delaying the output signal from the latch 3141 in the filtering circuit 314, a 1:3 demultiplexer 3152 for 1:3-demultiplexing an output signal from the adder 3143 in the filtering circuit 314, a latch 3153 for storing temporarily and delaying an output signal from the latch 3151, a latch 3154 for storing temporarily and delaying a first output signal from the 1:3 demultiplexer 3152, a latch 3155 for storing temporarily and delaying a second output signal from the 1:3 demultiplexer 3152, a latch 3156 for storing temporarily and delaying an output signal from the latch 3154, and a 4:1 multiplexer 3157 for selectively outputting output signals from the latches 3153, 3155 and 3156 and a third output signal from the 1:3 demultiplexer 3152.

The operation of the second embodiment of the 3:4 pixel converter 310 with the above-mentioned construction in accordance with the present invention will be described in detail with reference to FIGS. 14A to 14H, which are waveform diagrams of the signals from the components in FIG. 13.

Figure 14A:
FIGS. 14A to 14H are waveform diagrams of signals from components in FIG. 13.

First, in the coefficient generation circuit 316, the input sample clock, as shown in FIG. 14A, controlling the input timing of the video signal is counted in 2 bit units by the 2-bit counter 3161 in response to the synchronous signal, SYNC. The two output bits S3 and S4 from the 2-bit counter 3161 are applied to the multiplexer 3162, thereby causing the multiplexer 3162 to select one of the input coefficients A2, B2 and C2 and output the selected coefficient as the filtering coefficient K3 to the multiplier 3142 in the filtering circuit 314. The two output bits S3 and S4 from the 2-bit counter 3161 are also applied to the multiplexer 3163, thereby causing the multiplexer 3163 to select one of the input coefficients D2, E2 and F2 and output the selected coefficient as the filtering coefficient K4 to the multiplier 3144 in the filtering circuit 314.

Noticeably, the sum of the filtering coefficients K3 and K4 from the multiplexers 3162 and 3163 always becomes "1". Namely, at a period of three pixels, the filtering coefficient K3 becomes sequentially 0.25, 0.5 and 0.75, while the filtering coefficient K4 becomes sequentially 0.75, 0.5 and 0.25, resulting in insertion of the first input pixel in three pixel units. To this end, upon the input of three of the input sample clocks, that is, before the input of the fourth pixel after the input of the three pixels, the 2-bit counter 3161 is reset, thereby allowing the multiplexers 3162 and 3163 to sequentially select the input coefficients A2, B2 and C2, and D2, E2 and F2 in three pixel units.

In the filtering circuit 314, the video signal from the 3:4 line converter 210 is multiplied by the filtering coefficient K4 from the multiplexer 3163 by the multiplier 3144 and then applied to the adder 3143. Also, the video signal from the 3:4 line converter 210 is stored and delayed in pixel units by the latch 3141, multiplied by the filtering coefficient K3 from the multiplexer 3162 by the multiplier 3142 and then applied to the adder 3143.

The adder 3143 obtains the weighted average in consideration of the relative position of the output pixel with respect to the input pixel by adding the output signals from the multipliers 3142 and 3144. Then, in the signal output circuit 315, the output signal from the adder 3143 is 1:3-demultiplexed by the 1:3 demultiplexer 3152. Then, the third one of the three output signals from the 1:3 demultiplexer 3152, as shown in FIG. 14F, is directly applied to the 4:1 multiplexer 3157.

Figure 14B:
Figure 14C:
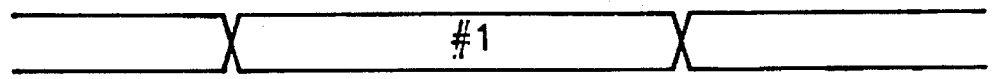
Figure 14D:
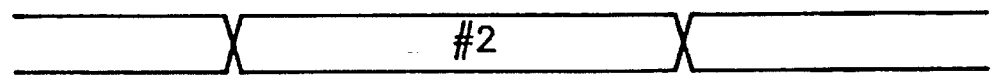
Figure 14E:
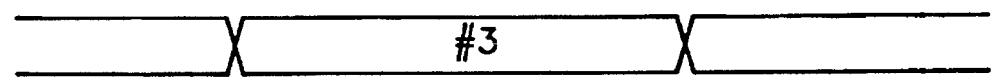
Figure 14F:
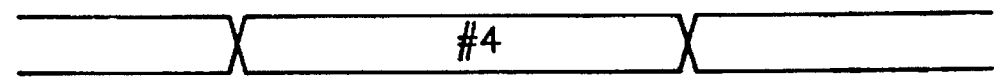
Figure 14G:
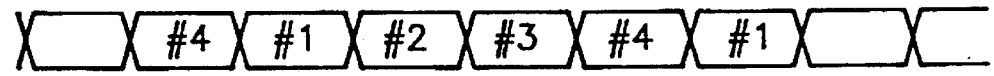
Figure 14H:

In response to a clock, as shown in FIG. 14B, having a frequency which is half that of an output sample clock, as shown in FIG. 14H, and for controlling output timing of the video signal, the output signal from the latch 3141 in the filtering circuit 314 is temporarily stored in the latch 3151, temporarily stored in the latch 3153 and then applied to the 4:1 multiplexer 3157 in the form as shown in FIG. 14C. The second output signal from the 1:3 demultiplexer 3152 is temporarily stored in the latch 3155 and then applied to the 4:1 multiplexer 3157 in the form as shown in FIG. 14D. Also, the first output signal from the 1:3 demultiplexer 3152 is temporarily stored in the latch 3154, temporarily stored in the latch 3156 and then applied to the 4:1 multiplexer 3157 in the form as shown in FIG. 14E.

As a result, the 4:1 multiplexer 3157 outputs sequentially the weighted average of the third and first input pixels from the 1:3 demultiplexer 3152, as shown in FIG. 14F, the first input pixel from the latch 3153, as shown in FIG. 14C, the weighted average of the first and second input pixels from the latch 3155, as shown in FIG. 14D, and the weighted average of the second and third input pixels from the latch 3156, as shown in FIG. 14E.

Figure 15:
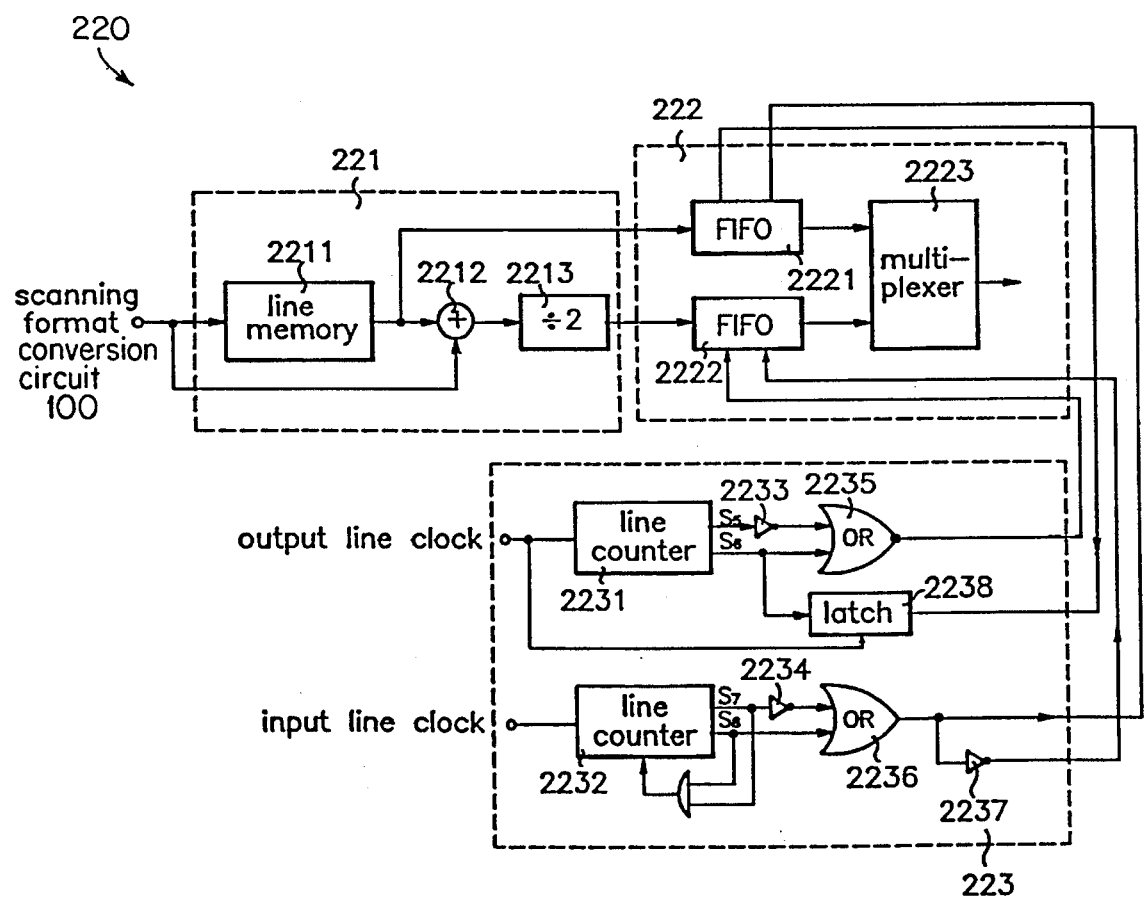
FIG. 15 is a detailed block diagram of a first embodiment of a 4:3 line converter in FIG. 1 in accordance with the present invention.

Referring to FIG. 15, there is shown a detailed block diagram of a first embodiment of the 4:3 line converter 220 in FIG. 1 in accordance with the present invention. As shown in this drawing, the 4:3 line converter 220 includes a filtering circuit 221, a signal output circuit 222 and an output controller 223.

The filtering circuit 221 delays and filters the video signal from the scanning format conversion circuit 100. To this end, the filtering circuit 221 includes a line memory 2211 for storing and delaying the video signal from the scanning format conversion circuit 100 in line units and outputting the delayed video signal to the signal output circuit 222, an adder 2212 for adding an output signal from the line memory 2211 to the video signal from the scanning format conversion circuit 100, and a divider 2213 for dividing an output signal from the adder 2212 by 2 to obtain an average of pixels in the same positions of adjacent lines of the video signal from the scanning format conversion circuit 100. The divided signal is output to the signal output circuit 222.

The signal output circuit 222 selectively outputs a plurality of output signals from the filtering circuit 221. To this end, the signal output circuit 222 includes an FIFO memory 2221 for storing temporarily the output signal from the line memory 2211 in the filtering circuit 221, an FIFO memory 2222 for storing temporarily an output signal from the divider 2213 in the filtering circuit 221, and a multiplexer 2223 for outputting selectively output signals from the FIFO memories 2221 and 2222.

The output controller 223 controls the signal output circuit 222 in response to input/output line clocks for controlling input/output timing of the video signal. To this end, the output controller 223 includes a line counter 2231 for counting the input line clock in 2 bit units, a line counter 2232 for counting the output line clock in 2 bit units, a NOT gate or inverter 2233 for inverting a first output bit S5 from the line counter 2231, a NOR gate 2235 for NORing an output signal from the NOT gate 2233 and a second output bit S6 from the line counter 2231 and outputting the NORed signal to the FIFO memory 2222 in the signal output circuit 222 for controlling a write operation thereof, a latch 2238 for storing temporarily the second output bit S6 from the line counter 231 for controlling a write operation of the FIFO memory 2221 in the signal output circuit 222, a NOT gate 2234 for inverting a first output bit S7 from the line counter 2232, an OR gate 2236 for ORing an output signal from the NOT gate 2234 and a second output bit S8 from the line counter 2232 and outputting the ORed signal to the FIFO memory 2221 for controlling a read operation thereof, and a NOT gate 2237 for inverting an output signal from the OR gate 2236 and outputting the inverted signal to the FIFO memory 2222 for controlling a read operation thereof.

The operation of the first embodiment of the 4:3 line converter 220 with the above-mentioned construction in accordance with the present invention will be described in detail with reference to FIGS. 16A to 16F, which are waveform diagrams of the signals from the components in FIG. 15.

First, in the filtering circuit 221, the video signal from the scanning format conversion circuit 100 is stored and delayed in line units by the line memory 2211 and then applied to the adder 2212, which also receives the video signal from the scanning format conversion circuit 100 directly. The adder 2212 adds the output signal from the line memory 2211 to the video signal from the scanning format conversion circuit 100. Then, the divider 213 obtains the average of the pixels in the same positions of the adjacent lines of the video signal from the scanning format conversion circuit 100 by dividing the output signal from the adder 2212 by 2. The output signals from the line memory 2211 and the divider 2213 are temporarily stored in the FIFO memories 2221 and 2222 in the signal output circuit 222, respectively.

Figure 16A:
FIGS. 16A to 16F are waveform diagrams of signals from components in FIG. 15.
Figure 16B:
Figure 16C:

In the output controller 223, the input line clock, as shown in FIG. 16B, is counted in 2 bit units by the line counter 2231. The first output bit S5 from the line counter 2231 is inverted by the NOT gate 2233 and then NORed by the NOR gate 2235 together with the second output bit S6 from the line counter 2231. The resultant signal from the NOR gate 2235, as shown in FIG. 16C, is applied to the FIFO memory 2222 in the signal output circuit 222 for controlling the write operation thereof.

Figure 16D:

Also, the second output bit S6 from the line counter 2231 is temporarily stored in the latch 2238 and then applied to the FIFO memory 2221 in the signal output circuit 222 in the form as shown in FIG. 16D for controlling the write operation thereof.

On the other hand, the output line clock, as shown in FIG. 16A, is counted in 2 bit units by the line counter 2232. The first output bit S7 from the line counter 2232 is inverted by the NOT gate 2234 and then ORed by the OR gate 2236 together with the second output bit S8 from the line counter 2232. The resultant signal from the OR gate 2236, as shown in FIG. 16E, is applied to the FIFO memory 2221 in the signal output circuit 222 for controlling the read operation thereof.

Figure 16E:
Figure 16F:

Also, the output signal from the OR gate 2236 is inverted by the NOT gate 2237 and then applied to the FIFO memory 2222 in the signal output circuit 222 in the form as shown in FIG. 16F for controlling the read operation thereof. The output signal from the NOT gate 2237, as shown in FIG. 16F, is also applied to the multiplexer 2223 in the signal output circuit 222 to control it.

Subsequently, only first and fourth ones of successive four lines of the video signal from the line memory 2211 are written into the FIFO memory 2221 in response to the output signal from the latch 2238, as shown in FIG. 16D. Also, the average of the pixels in the same positions of the second and third lines is written into the FIFO memory 2222 in response to the output signal from the NOR gate 2235, as shown in FIG. 16C.

The output signals from the OR gate 2236 and the NOT gate 2237 as shown in FIGS. 16E and 16F, control the reading operations of the FIFO memories 2221 and 2222, respectively, and the output of the multiplexer 2223. As a result, the first line and the average of the pixels in the same positions of the second and third lines are repeatedly outputted from the multiplexer 2223. Namely, sequentially outputted from the multiplexer 2223 are the first input line, the average of the pixels in the same positions of the second and third input lines, and the fourth input line. Therefore, the number of the vertical scanning lines is converted from 1050 lines to 787.5 lines.

Figure 17:
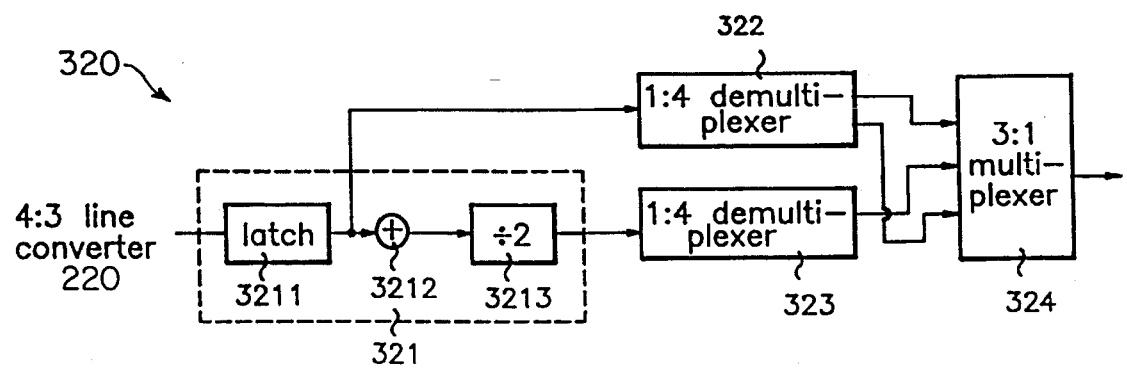
FIG. 17 is a detailed block diagram of a first embodiment of a 4:3 pixel converter in FIG. 1 in accordance with the present invention.

Referring to FIG. 17, there is shown a detailed block diagram of a first embodiment of the 4:3 pixel converter 320 in FIG. 1 in accordance with the present invention. As shown in this drawing, the 4:3 pixel converter 320 includes a filtering circuit 21, 1:4 demultiplexers 322 and 323 and a 3:1 multiplexer 324.

The filtering circuit 321 delays and filters the video signal from the 4:3 line converter 220. To this end, the filtering circuit 321 includes a latch 3211 for storing and delaying the video signal from the 4:3 line converter 220 in pixel units and outputting the delayed video signal to the 1:4 demultiplexer 322, an adder 3212 for adding an output signal from the latch 3211 to the video signal from the 4:3 line converter 220, and a divider 3213 for dividing an output signal from the adder 3212 by 2 to obtain an average of adjacent pixels of the video signal from the 4:3 line converter 220. The divided signal is output to the 1:4 demultiplexer 323.

The 1:4 demultiplexer 322 is adapted to 1:4-demultiplex the delayed video signal from the latch 3211 in the filtering circuit 321. The 1:4 demultiplexer 323 is adapted to 1:4-demultiplex the filtered video signal from the divider 3213 in the filtering circuit 321. The 3:1 multiplexer 324 is adapted to 3:1-multiplex output signals from the 1:4 demultiplexers 322 and 323.

The operation of the first embodiment of the 4:3 pixel converter 320 with the above-mentioned construction in accordance with the present invention will be described in detail with reference to FIGS. 18A to 18K, which are waveform diagrams of the signals from the components in FIG. 17.

Figure 18A:
FIGS. 18A to 18K are waveform diagrams of signals from components in FIG. 17.

First, in response to an input sample clock, as shown in FIG. 18A, for controlling input timing of the video signal, the video signal from the 4:3 line converter 220 is stored and delayed in pixel units by the latch 3211 and then applied to the adder 3212, which also receives the video signal from the 4:3 line converter 220 directly. The adder 3212 adds the output signal from the latch 3211 to the video signal from the 4:3 line converter 220. Then, the divider 3213 obtains the average of the adjacent pixels of the video signal from the 4:3 line converter 220 by dividing the output signal from the adder 3212 by 2. The output signal from the latch 3211 is also applied to the 1:4 demultiplexer 322.

Figure 18B:
Figure 18C:
Figure 18D:
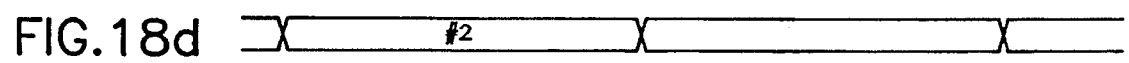
Figure 18E:
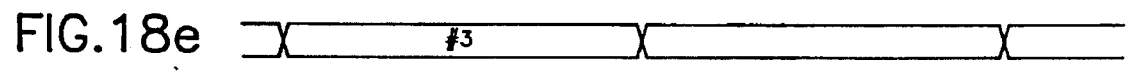
Figure 18F:
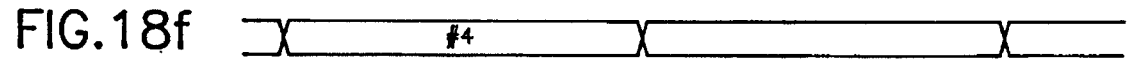
Figure 18G:
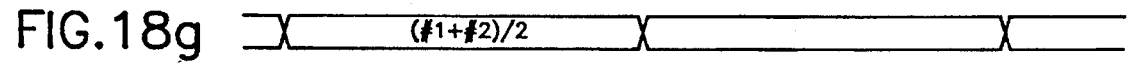
Figure 18H:
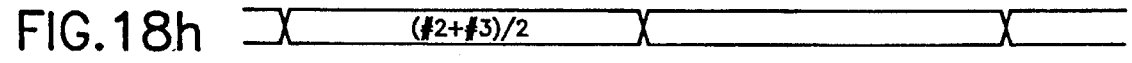
Figure 18I:
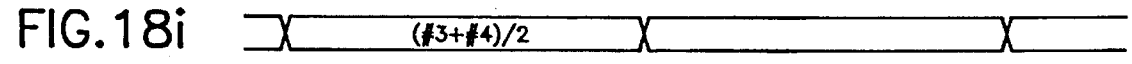
Figure 18J:
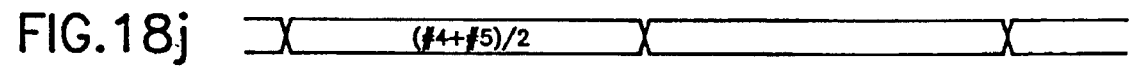
Figure 18K:
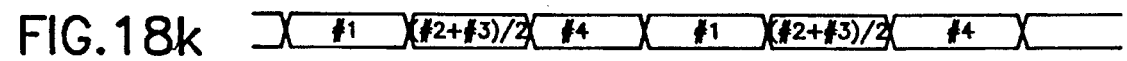

Then, in response to an output sample clock, as shown in FIG. 18B, for controlling output timing of the video signal, the 1:4 demultiplexer 322 outputs signals as shown in FIGS. 18C–18F and the 1:4 demultiplexer 323 outputs signals as shown in FIGS. 18G–18J. The 3:1 multiplexer 324 outputs selectively a part of the output signals from the 1:4 demultiplexers 322 and 323 in response to the output sample clock, as shown in FIG. 18B. Namely, sequentially outputted from the 3:1 multiplexer 324 are the first input pixel, the average of the second and third input pixels, and the fourth input pixel, as shown in FIG. 18K.

Figure 19:
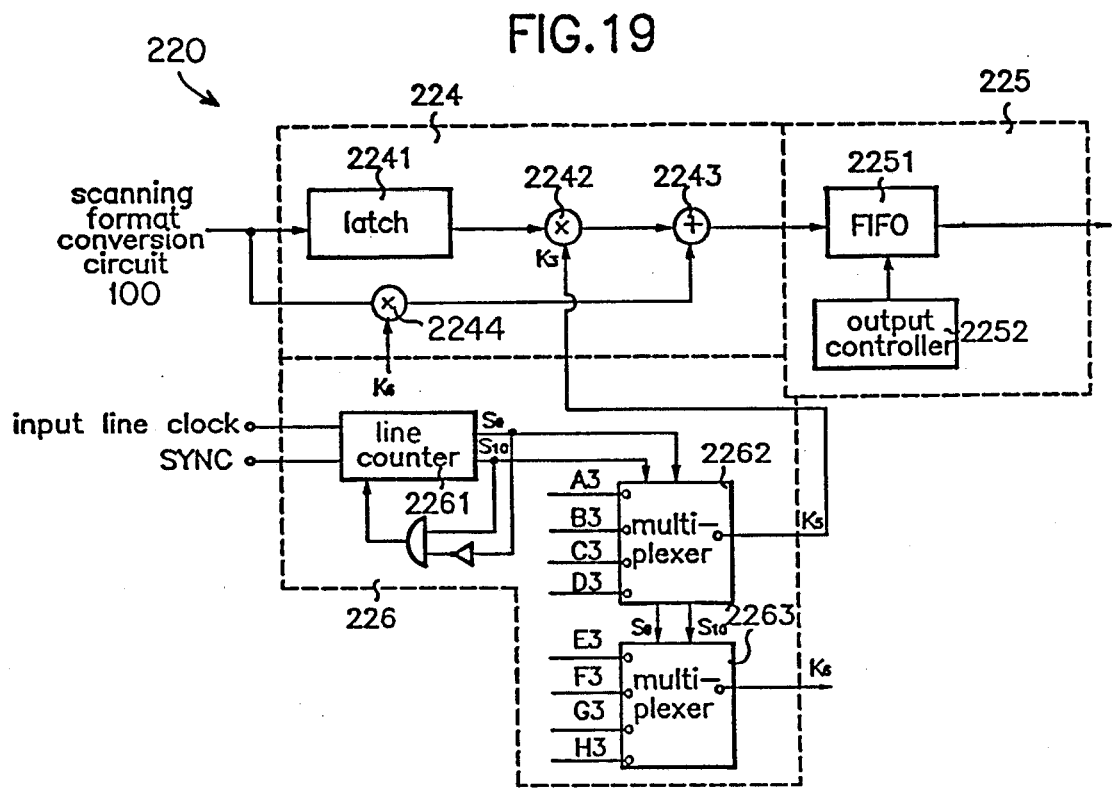
FIG. 19 is a detailed block diagram of a second embodiment of the 4:3 line converter in FIG. 1 in accordance with the present invention.

Referring to FIG. 19, there is shown a detailed block diagram of a second embodiment of the 4:3 line converter 220 of FIG. 1 in accordance with the present invention. As shown in this drawing, the 4:3 line converter 220 includes a coefficient generation circuit 226, a filtering circuit 224 and a signal output circuit 225.

The coefficient generation circuit 226 generates two filtering coefficients K5 and K6 in response to an input line clock for controlling input timing of the video signal and a synchronous signal, SYNC. To this end, the coefficient generation circuit 226 includes a line counter 2261 for counting the input line clock in 2 bit units in response to the synchronous signal, a multiplexer 2262 for selecting one of four input coefficients A3, B3, C3 and D3 in response to two output bits S9 and 810 from the line counter 2261 and outputting the selected input coefficient as the filtering coefficient K5 to the filtering circuit 224, and a multiplexer 2263 for selecting one of four input coefficients E3, F3, G3 and H3 in response to the two output bits S9 and S10 from the line counter 2261 and outputting the selected input coefficient as the filtering coefficient K6 to the filtering circuit 224.

The filtering circuit 224 filters the video signal from the scanning format conversion circuit 100 using a weighted average in consideration of a relative position of an output line with respect to an input line in response to the filtering coefficients K5 and K6 from the coefficient generation circuit 226. To this end, the filtering circuit 224 includes a line memory 2241 for storing and delaying the video signal from the scanning format conversion circuit 100 in line units, a multiplier 2242 for multiplying an output signal from the line memory 2241 by the filtering coefficient K5 from the multiplexer 2262 in the coefficient generation circuit 226, a multiplier 2244 for multiplying the video signal from the scanning format conversion circuit 100 by the filtering coefficient K6 from the multiplexer 2263 in the coefficient generation circuit 226, and an adder 2243 for adding output signals from the multipliers 2242 and 2244. The added signal is output to the signal output circuit 225. The signal output circuit 225 is adapted to selectively output an output signal from the filtering circuit 224. To this end, the signal output circuit 225 includes an FIFO memory 2251 for storing temporarily an output signal from the adder 2243 in the filtering circuit 224, and an output controller 2252 for controlling a write operation of the FIFO memory 2251 in response to the input line clock.

The operation of the second embodiment of the 4:3 line converter 220 with the above-mentioned construction in accordance with the present invention will be described in detail.

First, in the coefficient generation circuit 226, the input line clock controlling the input timing of the video signal is counted in 2 bit units by the line counter 2261 in response to the synchronous signal, SYNC. The two output bits S9 and S10 from the line counter 2261 are applied to the multiplexer 2262, thereby causing the multiplexer 2262 to select one of the input coefficients A3, B3, C3 and D3 and output the selected coefficient as the filtering coefficient K5 to the multiplier 2242 in the filtering circuit 224. The two output bits S9 and S10 from the line counter 2261 are also applied to the multiplexer 2263, thereby causing the multiplexer 2263 to select one of the input coefficients E3, F3, G3 and H3 and output the selected coefficient as the filtering coefficient K6 to the multiplier 2244 in the filtering circuit 224.

Noticeably, the sum of the filtering coefficients K5 and K6 from the multiplexers 2262 and 2263 always becomes "1". Namely, at a period of four lines, the filtering coefficient K5 becomes sequentially 1, 0.69, 0.31 and 0, while the filtering coefficient K6 becomes sequentially 0, 0.31, 0.69 and 1. For this reason, the fourth input line is removed in four line units. Namely, the line corresponding to the filtering coefficients K5 and K6 of "1" is not needed. Therefore, the multiplexers 2262 and 2263 sequentially select the input coefficients A3, B3, C3 and D3, and E3, F3, G3 and H3 in four line units.

In the filtering circuit 224, the video signal from the scanning format conversion circuit 100 is multiplied by the filtering coefficient K6 from the multiplexer 2263 by the multiplier 2244 and then applied to the adder 2243. Also, the video signal from the scanning format conversion circuit 100 is stored and delayed in line units by the line memory 2241, multiplied by the filtering coefficient K5 from the multiplexer 2262 by the multiplier 2242 and then applied to the adder 2243.

The adder 2243 obtains the weighted average in consideration of the relative position of the output line with respect to the input line by adding the output signals from the multipliers 2242 and 2244. Then, in the signal output circuit 225, the output signal from the adder 2243 is temporarily stored in the FIFO memory 2251 and then applied to the 4:3 pixel converter 320 under the control of the output controller 2252.

Figure 20:
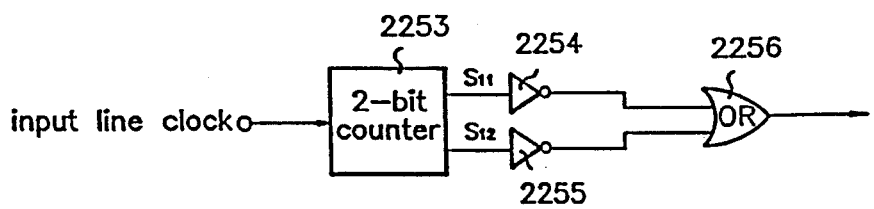
FIG. 20 is a detailed block diagram of an output controller in FIG. 19.

Referring to FIG. 20, there is shown a detailed block diagram of the output controller 2252 of FIG. 19. As shown in this drawing, the output controller 2252 includes a 2-bit counter 2253 for counting the input line clock in 2 bit units, a NOT gate 2254 for inverting a first output bit S11 from the 2-bit counter 2253, a NOT gate 2255 for inverting a second output bit S12 from the 2-bit counter 2253, and an OR gate 2256 for ORing output signals from the NOT gates 2254 and 2255. The ORed signal is output to the FIFO memory 2251 for controlling the write operation thereof.

The operation of the output controller 2252 with the above-mentioned construction in accordance with the present invention will be described in detail with reference to FIGS. 21A and 21B, which are waveform diagrams of the signals from the components in FIG. 20.

Figure 21A:
FIGS. 21A and 21B are waveform diagrams of signals from components in FIG. 20.
Figure 21B:

First, the input line clock, as shown in FIG. 21A, is counted in 2 bit units by the 2-bit counter 2253. The two output bits S11 and S12 from the 2-bit counter 2253 are inverted by the NOT gates 2254 and 2255 and then ORed by the OR gate 2256. Then, the output signal from the OR gate 2256, as shown in FIG. 21B, is applied to the FIFO memory 2251 for controlling the write operation thereof. As a result, sequentially outputted from the FIFO memory 2251 are the first input line from the adder 2243, the weighted average of the first and second input lines from the adder 2243, and the weighted average of the second and third input lines from the adder 2243, while the fourth input line from the adder 2243 is removed.

Referring to FIG. 22, there is shown a detailed block diagram of a third embodiment of the 4:3 line converter 220 of FIG. 1 in accordance with the present invention. As shown in this drawing, the 4:3 line converter 220 includes a line memory 227, a weighted average calculation circuit 228, a line counter 2296 and a signal output circuit 225'.

The line memory 227 stores and delays the video signal from the scanning format conversion circuit 100 in line units.

The weighted average calculation circuit 228 calculates a weighted average in consideration of a relative position of an output line with respect to an input line in response to the video signal from the scanning format conversion circuit 100 and an output signal from the line memory 227. To this end, the weighted average calculation circuit 228 includes a 16-divider 2281 for dividing the video signal from the scanning format conversion circuit 100 by 16, a 4-divider 2282 for dividing the video signal from the scanning format conversion circuit 100 by 4, and a 2-divider 2283 for dividing the video signal from the scanning format conversion circuit 100 by 2. The circuit 228 includes an adder 2284 for adding output signals from the 4-divider 2282 and the 2-divider 2283, an adder 2285 for adding an output signal from the 16-divider 2281 and the output signal from the 4-divider 2282, a subtracter 2286 for obtaining a difference between an output signal from the adder 2284 and the output signal from the 16-divider 2281, and a multiplexer 2287 for selecting one of the video signal from the scanning format conversion circuit 100, output signals from the adder 2285 and the subtracter 2286 and a ground signal, under control of the line counter 2296. The circuit 228 includes a 16-divider 2288 for dividing the output signal from the line memory 227 by 16, a 4-divider 2289 for dividing the output signal from the line memory 227 by 4, a 2-divider 2290 for dividing the output signal from the line memory 227 by 2, an adder 2291 for adding output signals from the 4-divider 2289 and the 2-divider 2290, an adder 2292 for adding an output signal from the 16-divider 2288 and the output signal from the 4-divider 2289, and a subtracter 2293 for obtaining a difference between an output signal from the adder 2291 and the output signal from the 16-divider 2288. The circuit 228 also includes a multiplexer 2294 for selecting one of the output signal from the line memory 227, output signals from the adder 2292 and the subtracter 2293 and the ground signal, under the control of the line counter 2296, and an adder 2295 for adding output signals from the multiplexers 2287 and 2294. The added signal is output to the signal output circuit 225'.

The line counter 2296 counts an input line clock controlling input timing of the video signal in 2 bit units in response to a synchronous signal, SYNC, and controls the multiplexers 2287 and 2294 in the weighted average calculation circuit 228 in accordance with the counted result.

The signal output circuit 225' has the same construction and operation as those of the signal output circuit 225 in FIG. 19. Namely, the signal output circuit 225' selectively outputs an outputs signal from the weighted average calculation circuit 228. To this end, the signal output circuit 225' includes an FIFO memory 2251' for storing temporarily an output signal from the adder 2295 in the weighted average calculation circuit 228, and an output controller 2252' for controlling a write operation of the FIFO memory 2251' in response to the input line clock. Also, the output controller 2252' has the same construction and operation as those of the output controller 2252 in FIG. 20 and details thereof will thus be omitted.

The operation of the third embodiment of the 4:3 line converter 220 with the above-mentioned construction in accordance with the present invention will be described in detail with reference to FIGS. 23A to 23F, which are waveform diagrams of the signals from the components in FIG. 22.

First, the video signal from the scanning format conversion circuit 100 is stored and delayed in line units by the line memory 227 and then applied to the weighted average calculation circuit 228. Then, in the weighted average calculation circuit 228, the output signal from the line memory 227, as shown in FIG. 23B, is divided by 16 by the 16-divider 2288, divided by 4 by the 4-divider 2289, and divided by 2 by the 2-divider 2290. The output signals from the 16-divider 2288 and the 4-divider 2289 are added by the adder 2292 and then applied to the multiplexer 2294. Also, the output signals from the 4-divider 2289 and the 2-divider 2290 are added by the adder 2291 and then applied to the subtracter 2293, which also receives the output signal from the 16-divider 2288 directly. The subtracter 2293 obtains the difference between the output signal from the adder 2291 and the output signal from the 16-divider 2288 and outputs the obtained difference to the multiplexer 2294.

As a result, the multiplexer 2294 inputs the output signal from the line memory 227, the output signals from the adder 2292 and the subtracter 2293 and the ground signal of "0". Here, the output signal from the line memory 227 is the same as the result obtained by multiplying the output signal from the line memory 227 by a filtering coefficient of 1. The output signal from the subtracter 2293 is the same as the result obtained by multiplying the output signal from the line memory 227 by a filtering coefficient of 0.69. The output signal from the adder 2292 is the same as the result obtained by multiplying the output signal from the line memory 227 by a filtering coefficient of 0.31. The ground signal is the same as the result obtained by multiplying the output signal from the line memory 227 by a filtering coefficient of 0.

Also, the video signal from the scanning format conversion circuit 100 is applied to the weighted average calculation circuit 228. In the weighted average calculation circuit 228, the video signal from the scanning format conversion circuit 100 is divided by 16 by the 16-divider 2281, divided by 4 by the 4-divider 2282, and divided by 2 by the 2-divider 2283. The output signals from the 16-divider 2281 and the 4-divider 2282 are added by the adder 2285 and then applied to the multiplexer 2287. Also, the output signals from the 4-divider 2282 and the 2-divider 2283 are added by the adder 2284 and then applied to the subtracter 2286, which also receives the output signal from the 16-divider 2281 directly. The subtracter 2286 obtains the difference between the output signal from the adder 2284 and the output signal from the 16-divider 2281 and outputs the obtained difference to the multiplexer 2287.

As a result, the multiplexer 2287 inputs the video signal from the scanning format conversion circuit 100, the output signals from the adder 2285 and the subtracter 2286 and the ground signal of "0". Here, the video signal from the scanning format conversion circuit 100 is the same as the result obtained by multiplying the video signal from the scanning format conversion circuit 100 by the filtering coefficient of 1. The output signal from the subtracter 2286 is the same as the result obtained by multiplying the video signal from the scanning format conversion circuit 100 by the filtering coefficient of 0.69. The output signal from the adder 2285 is the same as the result obtained by multiplying the video signal from the scanning format conversion circuit 100 by the filtering coefficient of 0.31. The ground signal is the same as the result obtained by multiplying the video signal from the scanning format conversion circuit 100 by the filtering coefficient of 0.

Under the control of the line counter 2296, the multiplexers 2287 and 2294 sequentially select the ground signal and the output signal from the line memory 227, the output signals from the subtracter 2286 and the adder 2292, the output signals from the adder 2285 and the subtracter 2293, and the video signal from the scanning format conversion circuit 100 and the ground signal. Therefore, the weighted average in consideration of the relative position of the output line with respect to the input line is obtained in such a manner that the signals making the sum of the filtering coefficients "1" are selected by the multiplexers 2287 and 2294 and then added by the adder 2295 under the control of the line counter 2296.

On the other hand, the input line clock, as shown in FIG. 23A, is counted in 2 bit units by the line counter 2296 in response to the synchronous signal. The two output bits from the line counter 2296, as shown in FIGS. 23C and 23D, are applied to the multiplexers 2287 and 2294 in the weighted average calculation circuit 228, thereby causing the multiplexers 2287 and 2294 to select the video signal from the scanning format conversion circuit 100, the output signal from the line memory 227, the ground signal, and the output signals from the subtracters 2286 and 2293 and the adders 2285 and 2292 in the weighted average calculation circuit 228 to produce the sum of the filtering coefficients "1". In other words, under the control of the two output bits from the line counter 2296 as shown in FIGS. 23C and 23D, the multiplexer 2287 selects alternately the ground signal, the output signal from the subtracter 2286, the output signal from the adder 2285, and the video signal from the scanning format conversion circuit 100 at a period of four lines, and the multiplexer 2294 selects alternately the output signal from the line memory 227, the output signal from the adder 2292, the output signal from the subtracter 2293 and the ground signal at the period of the four lines.

Subsequently, the multiplexer 2294 outputs, as shown in FIG. 23E, a first one of successive four lines of the video signal, the resultant signal obtained by multiplying the second line by 0.69, the resultant signal obtained by multiplying the third line by 0.31 and the ground signal obtained by multiplying the fourth line by 0. Also, the multiplexer 2287 outputs, as shown in FIG. 23F, the ground signal obtained by multiplying the second line by 0, the resultant signal obtained by multiplying the third line by 0.31, the resultant signal obtained by multiplying the fourth line by 0.69 and the first line.

Then, the output signals from the multiplexers 2294 and 2287 are added by the adder 2295 and then outputted through the FIFO memory 2251' in the signal output circuit 225'. Under the control of the output controller 2252', sequentially outputted from the FIFO memory 2251' are the first input line, the weighted average of the pixels in the same positions of the first and second input lines, and the weighted average of the pixels in the same positions of the second and third input lines, while the fourth input line is not selected.

Figure 24:
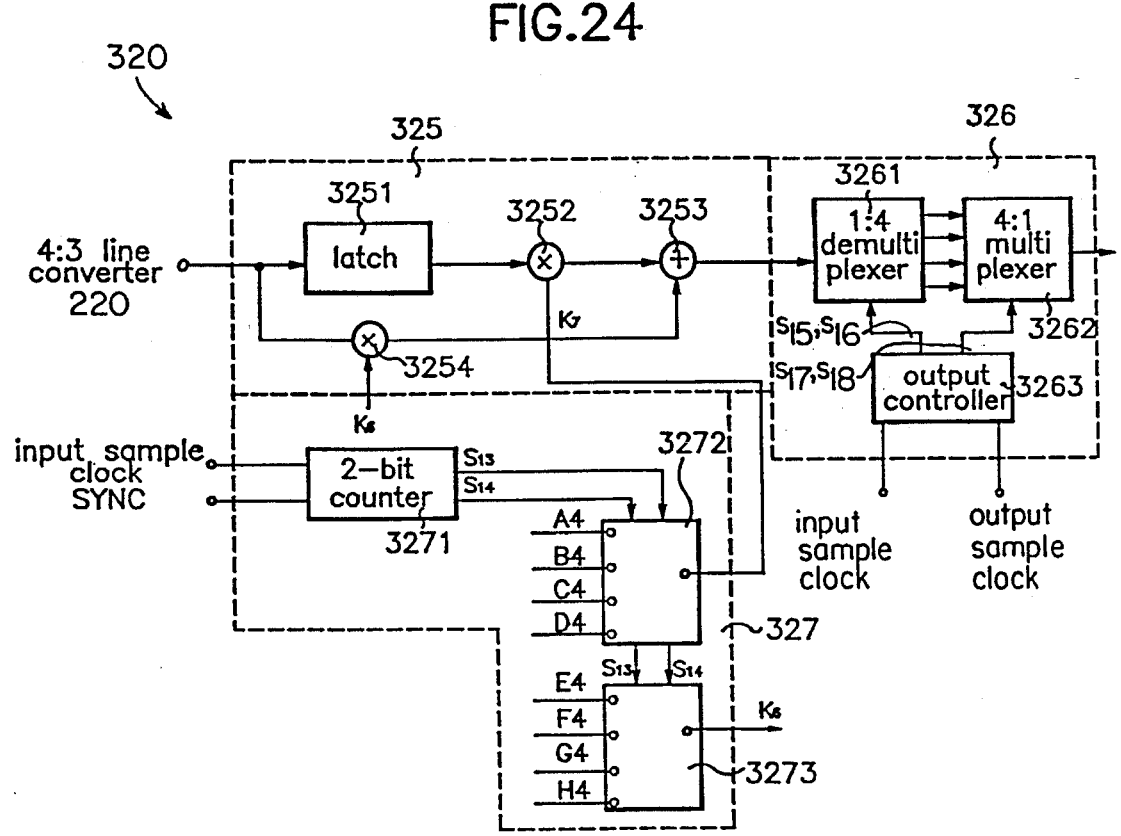
FIG. 24 is a detailed block diagram of a second embodiment of the 4:3 pixel converter in FIG. 1 in accordance with the present invention.

Referring to FIG. 24, there is shown a detailed block diagram of a second embodiment of the 4:3 pixel converter 320 of FIG. 1 in accordance with the present invention. As shown in this drawing, the 4:3 pixel converter 320 includes a coefficient generation circuit 327, a filtering circuit 325 and a signal output circuit 326.

The coefficient generation circuit 327 generates two filtering coefficients K7 and K8 in response to an input sample clock for controlling input timing of the video signal and a synchronous signal, SYNC. To this end, the coefficient generation circuit 327 includes a 2-bit counter 3271 for counting the input sample clock in 2 bit units in response to the synchronous signal, a multiplexer 3272 for selecting one of four input coefficients A4, B4, C4 and D4 in response to two output bits S13 and S14 from the 2-bit counter 3271 and outputting bits S13 and S14 from the selected input coefficient as the filtering coefficient K7 to the filtering circuit 325, and a multiplexer 3273 for selecting one of four input coefficients E4, F4, G4 and H4 in response to the two output bits S13 and S14 from the 2-bit counter 3271 and outputting the selected input coefficient as the filtering coefficient K8 to the filtering circuit 325.

The filtering circuit 325 filters the video signal from the 4:3 line converter 220 using a weighted average in consideration of a relative position of an output pixel with respect to an input pixel in response to the filtering coefficients K7 and K8 from the coefficient generation circuit 327. To this end, the filtering circuit 325 includes a latch 3251 for storing and delaying the video signal from the 4:3 line converter 220 in pixel units, a multiplier 3252 for multiplying an output signal from the latch 3251 by the filtering coefficient K7 from the multiplexer 3272 in the coefficient generation circuit 327, a multiplier 3254 for multiplying the video signal from the 4:3 line converter 220 by the filtering coefficient K8 from the multiplexer 3273 in the coefficient generation circuit 327, and an adder 3253 for adding output signals from the multipliers 3252 and 3254. The added signal is output to the signal output circuit 326.

The signal output circuit 326 selectively outputs an output signal from the filtering circuit 325 in response to the input sample clock and an output sample clock for controlling output timing of the video signal. To this end, the signal output circuit 326 includes a 1:4 demultiplexer 3261 for 1:4-demultiplexing an output signal from the adder 3253 of the filtering circuit 325, a 4:1 multiplexer 3262 for 4:1-multiplexing output signals from the 1:4 demultiplexer 3261, and an output controller 3263 for controlling the 1:4 demultiplexer 3261 and the 4:1 multiplexer 3262 in response to the input sample clock and the output sample clock.

Figure 25:
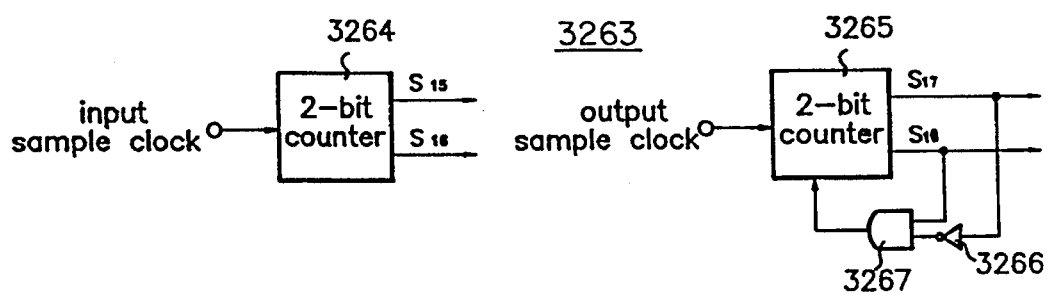
FIG. 25 is a detailed block diagram of an output controller in FIG. 24.

Referring to FIG. 25, there is shown a detailed block diagram of the output controller 3263 in FIG. 24. As shown in this drawing, the output controller 3263 includes a 2-bit counter 3264 for counting the input sample clock in 2 bit units and providing two output bits S15 and S16 to control the 1:4 demultiplexer 3261 in accordance with the counted result. The output controller 3263 includes a 2-bit counter 3265 for counting the output sample clock in 2 bit units and providing two output bits S17 and S18 to control the 4:1 multiplexer 3262 in accordance with the counted result. The output controller 3263 also includes a NOT gate 3266 for inverting the output bit S17 from the 2-bit counter 3265 and an AND gate 3267 for ANDing the output bit S18 from the 2-bit counter 3265 and an output signal from the NOT gate 3266. The ANDed signal is output to the 2-bit counter 3265 to control it.

Now, the operation of the second embodiment of the 4:3 pixel converter 320 with the above-mentioned construction in accordance with the present invention will be described in detail with reference to FIGS. 26A to 26H, which are waveform diagrams of the signals from the components in FIG. 24.

Figure 26A:
FIGS. 26A to 26H are waveform diagrams of signals from components in FIG. 24.

First, in the coefficient generation circuit 327, the input sample clock, as shown in FIG. 26A, which controls the input timing of the video signal, is counted in 2 bit units by the 2-bit counter 3271 in response to the synchronous signal. The two output bits S13 and S14 from the 2-bit counter 3271 are applied to the multiplexer 3272, thereby causing the multiplexer 3272 to select one of the input coefficients A4, B4, C4 and D4 and output the selected coefficient as the filtering coefficient K7 to the multiplier 3252 in the filtering circuit 325. The two output bits S13 and S14 from the 2-bit counter 3271 are also applied to the multiplexer 3273, thereby causing the multiplexer 3273 to select one of the input coefficients E4, F4, G4 and H4 and output the selected coefficient as the filtering coefficient K8 to the multiplier 3254 in the filtering circuit 325.

Noticeably, the sum of the filtering coefficients K7 and K8 from the multiplexers 3272 and 3273 always becomes "1". Namely, at a period of four pixels, the filtering coefficient K7 becomes sequentially 0, 0.31, 0.69 and 1, while the filtering coefficient K8 becomes sequentially 1, 0.69, 0.31 and 0. For this reason, the fourth input pixel is removed in four pixel units. Upon inputting four of the input sample clocks, that is, before the input of the fifth pixel after the input of the four pixels, the 2-bit counter 3271 is reset, thereby allowing the multiplexers 3272 and 3273 to sequentially select the input coefficients A4, 54, C4 and D4, and E4, F4, G4 and H4 in four pixel units.

In the filtering circuit 325, the video signal from the 4:3 line converter 220 is multiplied by the filtering coefficient K8 from the multiplexer 3273 by the multiplier 3254 and then applied to the adder 3253. Also, the video signal from the 4:3 line converter 220 is stored and delayed in pixel units by the latch 3251, multiplied by the filtering coefficient K7 from the multiplexer 3272 by the multiplier 3252, and then applied to the adder 3253.

The adder 3253 obtains the weighted average in consideration of the relative position of the output pixel with respect to the input pixel by adding the output signals from the multipliers 3252 and 3254. Then, in the signal output circuit 326, the output signal from the adder 3253 is 1:4-demultiplexed by the 1:4 demultiplexer 3261 and then applied to the 4:1 multiplexer 3262.

In the output controller 3263 of the signal output circuit 326, the input sample clock, as shown in FIG. 26A, is counted in 2 bit units by the 2-bit counter 3264, which thus provides the two output bits S15 and S16 for controlling the 1:4 demultiplexer 3261. As a result, under the control of the two output bits S15 and S16 from the 2-bit counter 3264, the 1:4 demultiplexer 3261 outputs the signals as shown in FIGS. 26B–26E.

Figure 26B:
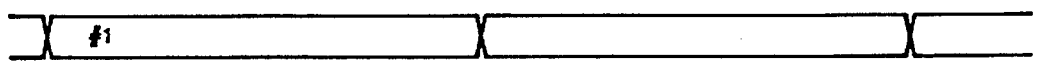
Figure 26C:
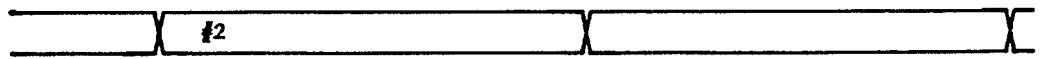
Figure 26D:
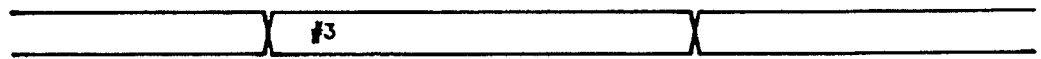
Figure 26E:
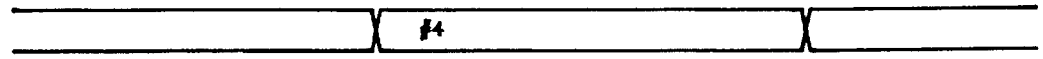
Figure 26F:
Figure 26G:
Figure 26H:

Also in the output controller 3263 of the signal output circuit 326, the output sample clock, as shown in FIG. 26H, is counted in 2 bit units by the 2-bit counter 3265, which thus provides the two output bits S17 and S18, as shown in FIG. 26F, for controlling the 4:1 multiplexer 3262. As a result, under the control of the two output bits S17 and S18 from the 2-bit counter 3265, the 4:1 multiplexer 3262 outputs the output signals from the 1:4 demultiplexer 3261 with the fourth input pixel removed, as shown in FIGS. 26G. The output bit S17 from the 2-bit counter 3265 is inverted by the NOT gate 3266 and then ANDed by the AND gate 3267 together with the output bit S18 from the 2-bit counter 3265. Then, the output signal from the AND gate 3267 is applied back to the 2-bit counter 3265 to reset it upon counting three output sample clocks. Therefore, sequentially outputted from the 4:1 multiplexer 3262 are a first one of successive four pixels of the video signal, as shown in FIG. 26B, the weighted average of the second and third input pixels as shown in FIG. 26C, and the weighted average of the third and fourth input pixels as shown in FIG. 26D, while the fourth input pixel as shown in FIG. 26E is removed.

Figure 27:
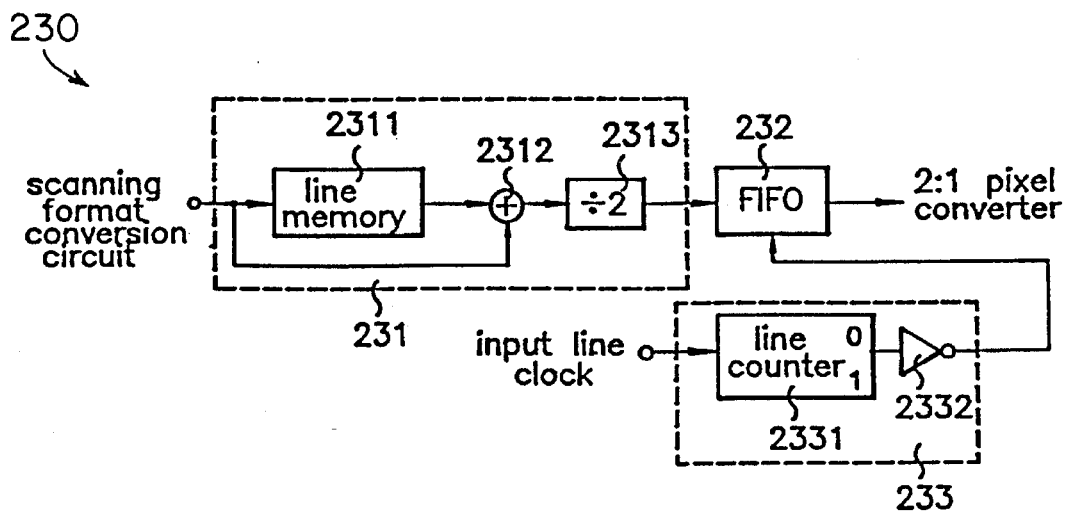
FIG. 27 is a detailed block diagram of a 2:1 line converter in FIG. 1 in accordance with the present invention.

Referring to FIG. 27, there is shown a detailed block diagram of the 2:1 line converter 230 of FIG. 1 in accordance with the present invention. As shown in this drawing, the 2:1 line converter 230 includes a filtering circuit 231, an FIFO memory 232 and an output controller 233.

The filtering circuit 231 delays and filters the video signal from the scanning format conversion circuit 100. The filtering circuit 231 includes a line memory 2311 for storing and delaying the video signal from the scanning format conversion circuit 100 in line units, an adder 2312 for adding an output signal from the line memory 2311 to the video signal from the scanning format conversion circuit 100, and a divider 2313 for dividing an output signal from the adder 2312 by 2 to obtain an average of pixels in the same positions of adjacent lines of the video signal from the scanning format conversion circuit 100. The divided signal is output to the FIFO memory 232.

The FIFO memory 232 stores temporarily an output signal from the divider 2313 in the filtering circuit 231.

The output controller 233 controls the FIFO memory 232 in response to an input line clock for controlling input timing of the video signal. The output controller 233 includes a line counter 2331 for counting the input line clock in 2 bit units, and a NOT gate 2332 for inverting a first one of two output bits from the line counter 2331 and outputting the inverted signal to the FIFO memory 232 to control a write operation thereof.

Figure 28A:
FIGS. 28A to 28C are waveform diagrams of signals from components in FIG. 27.

The operation of the 2:1 line converter 230 with the above-mentioned construction in accordance with the present invention will be described in detail with reference to FIGS. 28A to 28C, which are waveform diagrams of the signals from the components in FIG. 27.

First, in the filtering circuit 231, the video signal from the scanning format conversion circuit 100 is stored and delayed in line units by the line memory 2311 and then applied to the adder 2312, which also receives the video signal from the scanning format conversion circuit 100 directly. The adder 2312 adds the output signal from the line memory 2311 to the video signal from the scanning format conversion circuit 100. Then, the divider 2313 obtains the average of the pixels in the same positions of the adjacent lines of the video signal from the scanning format conversion circuit 100 by dividing the output signal from the adder 2312 by 2. Noticeably, the divider 2313 obtains the average of the pixels in the same positions of the adjacent lines at a period of two input lines.

Figure 28B:
Figure 28C:

On the other hand, in the output controller 233, the input line clock as shown in FIG. 28B, is counted in 2 bit units by the line counter 2331. The first output bit from the line counter 2331 is inverted by the NOT gate 2332 and then applied to the FIFO memory 232 for controlling the write operation thereof. Then, a signal as shown in FIG. 28C is read from the FIFO memory 232 in response to an output line clock, as shown in FIG. 28A.

Figure 29:
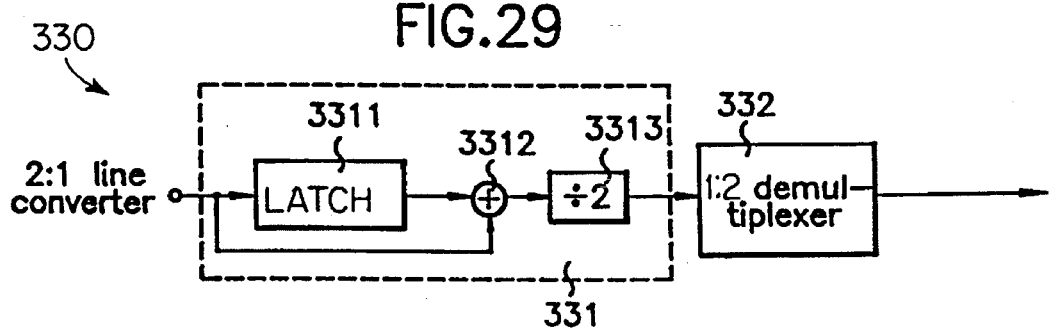
FIG. 29 is a detailed block diagram of a 2:1 pixel converter in FIG. 1 in accordance with the present invention.

Referring to FIG. 29, there is shown a detailed block diagram of the 2:1 pixel converter 330 of FIG. 1 in accordance with the present invention. As shown in this drawing, the 2:1 pixel converter 330 includes a filtering circuit 331 for delaying and filtering the video signal from the 2:1 line converter 230, and a 1:2 demultiplexer 332 for 1:2-demultiplexing an output signal from the filtering circuit 331.

The filtering circuit 331 includes a latch 3311 for storing and delaying the video signal from the 2:1 line converter 230 in pixel units, an adder 3312 for adding an output signal from the latch 3311 to the video signal from the 2:1 line converter 230, and a divider 3313 for dividing an output signal from the adder 3312 by 2 to obtain an average of adjacent pixels of the video signal from the 2:1 line converter 230. The divided signal is output to the 1:2 demultiplexer 332.

In operation, the video signal from the 2:1 line converter 230 is stored and delayed in pixel units by the latch 3311 and then applied to the adder 3312, which also receives the video signal from the 2:1 line converter 230 directly. The adder 3312 adds the output signal from the latch 3311 to the video signal from the 2:1 line converter 230. Then, the divider 3313 obtains the average of the adjacent pixels of the video signal from the 2:1 line converter 230 by dividing the output signal from the adder 3312 by 2. The pixel average from the divider 3313 is 1:2-demultiplexed by the 1:2 demultiplexer 332.

Figure 30:
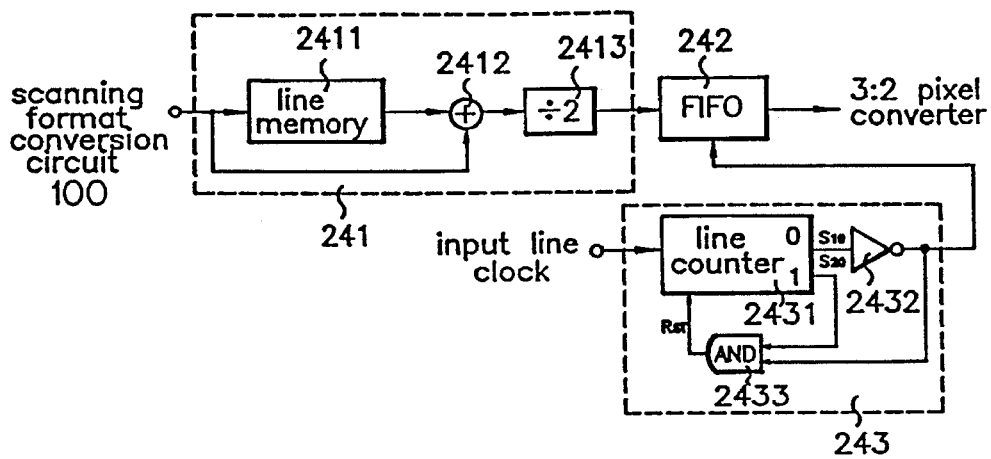
FIG. 30 is a detailed block diagram of a 3:2 line converter in FIG. 1 in accordance with the present invention.

Referring to FIG. 30, there is shown a detailed block diagram of the 3:2 line converter 240 of FIG. 1 in accordance with the present invention. As shown in this drawing, the 3:2 line converter 240 includes a filtering circuit 241, an FIFO memory 242 and an output controller 243.

The filtering circuit 241 delays and filters the video signal from the scanning format conversion circuit 100. The filtering circuit 241 includes a line memory 2411 for storing and delaying the video signal from the scanning format conversion circuit 100 in line units, an adder 2412 for adding an output signal from the line memory 2411 to the video signal from the scanning format conversion circuit 100, and a divider 2413 for dividing an output signal from the adder 2412 by 2 to obtain an average of pixels in the same positions of adjacent lines of the video signal from the scanning format conversion circuit 100. The divided signal is output to the FIFO memory 242.

The FIFO memory 242 stores temporarily an output signal from the divider 2413 in the filtering circuit 241.

The output controller 243 controls the FIFO memory 242 in response to an input line clock for controlling input timing of the video signal. To this end, the output controller 243 includes a line counter 2431 for counting the input line clock in 2 bit units, a NOT gate 2432 for inverting a first output bit S19 from the line counter 2431 and outputting the inverted signal to the FIFO memory 242 to control a write operation thereof, and an AND gate 2433 for ANDing a second output bit S20 from the line counter 2431 and an output signal from the NOT gate 2432 and outputting the ANDed signal back to the line counter 2431 to control it.

The operation of the 3:2 line converter 240 with the above-mentioned construction in accordance with the present on will be described in detail with reference to FIGS. 31A and 31B, which are waveform diagrams of signals from the components in FIG. 30.

First, in the filtering circuit 241, the video signal from the scanning format conversion circuit 100 is stored and delayed in line units by the line memory 2411 and then applied to the adder 2412, which also receives the video signal from the scanning format conversion circuit 100 directly. The adder 2412 adds the output signal from the line memory 2411 to the video signal from the scanning format conversion circuit 100. Then, the divider 2413 obtains the average of the pixels in the same positions of the adjacent lines of the video signal from the scanning format conversion circuit 100 by dividing the output signal from the adder 2412 by 2.

Figure 31A:
FIGS. 31A and 31B are waveform diagrams of signals from components in FIG. 30.
Figure 31B:

On the other hand, in the output controller 243, the input line clock, as shown in FIG. 31A, is counted in 2 bit units by the line counter 2431. The first output bit S19 from the line counter 2431 is inverted by the NOT gate 2432 and then applied to the FIFO memory 242 to control the write operation thereof. As a result, the FIFO memory 242 operates in response to the output signal from the NOT gate 2432, as shown in FIG. 31B, to sequentially output the average of the pixels in the same positions of first and second ones of successive three lines of the video signal and the average of the pixels in the same positions of the second and third lines.

Figure 32:
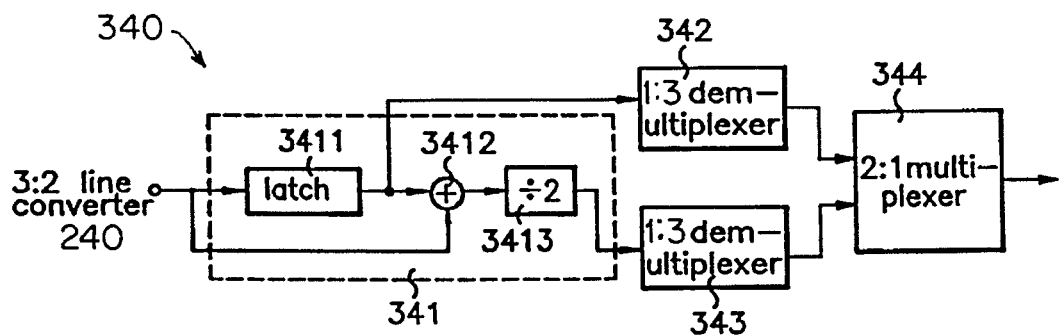
FIG. 32 is a detailed block diagram of a 3:2 pixel converter in FIG. 1 in accordance with the present invention.

Referring to FIG. 32, there is shown a detailed block diagram of the 3:2 pixel converter 340 of FIG. 1 in accordance with the present invention. As shown in this drawing, the 3:2 pixel converter 340 includes a filtering circuit 341, 1:3 demultiplexers 342 and 343 and a 2:1 multiplexer 344.

The filtering circuit 341 delays and filters the video signal from the 3:2 line converter 240. The filtering circuit 341 includes a latch 3411 for storing and delaying the video signal from the 3:2 line converter 240 in pixel units and outputting the delayed video signal to the 1:3 demultiplexer 342, an adder 3412 for adding an output signal from the latch 3411 to the video signal from the 3:2 line converter 240, and a divider 3413 for dividing an output signal from the adder 3412 by 2 to obtain an average of adjacent pixels of the video signal from the 3:2 line converter 240. The divided signal is output to the 1:3 demultiplexer 343.

The 1:3 demultiplexer 342 is adapted to 1:3-demultiplex the delayed video signal from the latch 3411 in the filtering circuit 341. The 1:3 demultiplexer 343 is adapted to 1:3-demultiplex the filtered video signal from the divider 3413 in the filtering circuit 341. The 2:1 multiplexer 344 is adapted to 2:1-multiplex output signals from the 1:3 demultiplexers 342 and 343.

The operation of the 3:2 pixel converter 340 with the above-mentioned construction in accordance with the present invention will be described in detail.

First, the video signal from the 3:2 line converter 240 is stored and delayed in pixel units by the latch 3411 and then applied to the adder 3412, which also receives the video signal from the 3:2 line converter 240 directly. The adder 3412 adds the output signal from the latch 3411 to the video signal from the 3:2 line converter 240. Then, the divider 3413 obtains the average of the adjacent pixels of the video signal from the 3:2 line converter 240 by dividing the output signal from the adder 3412 by 2. The output signal from the latch 3411 is also applied to the 1:3 demultiplexer 342, which provides only one output. Also, the output signal from the divider 3413 is 1:3-demultiplexed by the 1:3 demultiplexer 343, which provides only one output.

Then, the output signals from the 1:3 demultiplexers 342 and 343 are alternatively selected by the 2:1 multiplexer 344. As a result, sequentially outputted from the 2:1 multiplexer 344 are a first one of successive three pixels of the video signal and the average of the second and third pixels.

As apparent from the above description, according to the present invention, any one of the various frame formats transmitted from the broadcasting station can readily be converted into the display format of the monitor with implementation of a simple hardware.

Although the preferred embodiments of the present invention have been disclosed for illustration purposes, those skilled in the art will appreciate that various modifications, additions and substitutions are possible, without departing from the scope and spirit of the invention as disclosed in the accompanying claims.

What is claimed is:

1. An apparatus for converting a frame format of a television signal to a display format, comprising:

scanning format conversion means for converting a scanning format of an input video signal to a progressive scanning type when the scanning format of the input video signal is an interlaced scanning type;

scanning line conversion means for converting a number of vertical scanning lines of an output video signal from said scanning format conversion means to a number of vertical scanning lines for the display format, said scanning line conversion means including:

3:4 line conversion means for converting the number of the vertical scanning lines of the output video signal from said scanning format conversion means to 1050 lines when the output video signal has 787.5 lines;

4:3 line conversion means for converting the number of the vertical scanning lines of the video signal from said scanning format conversion means to 787.5 lines when the output video signal has 1050 lines;

2:1 line conversion means for converting the number of the vertical scanning lines of the output video signal from said scanning format conversion means to 525 lines when the output video signal has 1050 lines; and 3:2 line conversion means for converting the number of the vertical scanning lines of the output video signal from said scanning format conversion means to 525 lines when the output video signal has 787.5 lines;

horizontal pixel conversion means for converting a number of horizontal pixels of an output video signal from said scanning line conversion means to a number of horizontal pixels for the display format, said horizontal pixel conversion means including:

3:4 pixel conversion means for converting the number of horizontal pixels of an output video signal from said 3:4 line conversion means in said scanning line conversion means at a ratio of 3:4;

4:3 pixel conversion means for converting the number of horizontal pixels of an output video signal from said 4:3 line conversion means in said scanning line conversion means at a ratio of 4:3;

2:1 pixel conversion means for converting the number of horizontal pixels of an output video signal from said 2:1 line conversion means in said scanning line conversion means at a ratio of 2:1; and 3:2 pixel conversion means for converting the number of horizontal pixels of an output video signal from said 3:2 line conversion means in said scanning line conversion means at a ratio of 3:2; and format control means for controlling said scanning format conversion means, said scanning line conversion means, and said horizontal pixel conversion means to convert a frame format of the input video signal to the display format.

2. The apparatus of claim 1, wherein said scanning format conversion means includes:

line average calculation means for delaying the input video signal and calculating an average of pixels in the same positions of upper and lower lines of the input video signal;

a first first-in-first-out (FIFO) memory for storing temporarily the delayed video signal from said line average calculation means;

a second FIFO memory for storing temporarily the calculated average from said line average calculation means; and a multiplexer for selecting alternately output signals from said first and second FIFO memories.

3. The apparatus of claim 2, wherein said line average calculation means includes:

a line memory for storing and delaying the input video signal in line units and outputting the delayed video signal to said first FIFO memory;

an adder for adding the delayed video signal from said line memory to the input video signal; and a divider for dividing an output signal from said adder by 2 and outputting the divided signal to said second FIFO memory.

4. The apparatus of claim 1, wherein said scanning format conversion means includes:

frame average calculation means for calculating an average of pixels in the same positions of preceding and following frames of the input video signal;

line average calculation means for calculating an average of pixels in the same positions of upper and lower lines of the input video signal;

motion detection means for detecting an image motion in the input video signal in response to output signals from said frame average calculation means and said line average calculation means; and output signal selection means for selecting one of the output signals from said frame average calculation means and said line average calculation means under control of said motion detection means and for outputting alternately the selected signal and the input video signal.

5. The apparatus for converting a frame format of a television signal, according to claim 4, wherein said frame average calculation means includes:

a first field memory for storing the input video signal in field units;

a second field memory for storing an output signal from said first field memory in the field units;

a first adder for adding an output signal from said second field memory to the input video signal; and a first divider for dividing an output signal from said first adder by 2.

6. The apparatus of claim 5, wherein said line average calculation means includes:

a line memory for storing and delaying the output signal from said first field memory in said frame average calculation means in line units;

a second adder for adding an output signal from said line memory to the output signal from said first field memory; and a second divider for dividing an output signal from said second adder by 2.

7. The apparatus of claim 6, wherein said motion detection means includes:

a first subtracter for calculating a difference between the output signal from said first field memory in said frame average calculation means and the output signal from said line memory in said line average calculation means;

a second subtracter for calculating a difference between an output signal from said first divider in said frame average calculation means and an output signal from said second divider in said line average calculation means;

a first comparator for comparing an output signal from said first subtracter with a first predetermined threshold value;

a second comparator for comparing an output signal from said second subtracter with a second predetermined threshold value; and an AND gate for performing a logical AND operation on output signals from said first and second comparators.

8. The apparatus of claim 6, wherein said output signal selection means includes:

a first multiplexer for selecting one of the output signals from said first divider in said frame average calculation means and said second divider in said line average calculation means under control of said motion detection means;

a first FIFO memory for storing temporarily an output signal from said first multiplexer;

a second FIFO memory for storing temporarily the output signal from said line memory in said line average calculation means; and a second multiplexer for selecting one of output signals from said first and second FIFO memories.

9. The apparatus of claim 1, further comprising input and output line clocks for controlling input and output timings of the video signal, wherein said 3:4 line conversion means includes:

filtering means for delaying and filtering the video signal from said scanning format conversion means and providing a plurality of output signals;

signal output means for selecting one of the plurality of output signals from said filtering means; and output control means for controlling said signal output means in response to the input and output line clocks for controlling the input and output timing of the video signal.

10. The apparatus of claim 9, wherein said filtering means includes:

a line memory for storing and delaying the video signal from said scanning format conversion means in line units and outputting the delayed video signal to said signal output means;

an adder for adding an output signal from said line memory to the video signal from said scanning format conversion means; and a divider for dividing an output signal from said adder by 2 to obtain an average of pixels in the same positions of adjacent lines of the video signal from said scanning format conversion means and for outputting the divided signal to said signal output means.

11. The apparatus of claim 10, wherein said signal output means includes:

a first FIFO memory for storing temporarily the output signal from said line memory in said filtering means;

a second FIFO memory for storing temporarily an output signal from said divider in said filtering means; and a multiplexer for selecting one of output signals from said first and second FIFO memories.

12. The apparatus of claim 11, wherein said output control means includes:

a first line counter for counting the output line clock in 2 bit units;

a second line counter for counting the input line clock in the 2 bit units;

an OR gate for performing an OR logical operation on two output bits from said first line counter and outputting the ORed signal to said second FIFO memory and said multiplexer in said signal output means;

a NOR gate for performing an NOR logical operation or two output bits from said second line counter and outputting the NORed signal to said first FIFO memory in said signal output means; and a NOT gate for inverting an output signal from said OR gate and outputting the inverted signal to said first FIFO memory in said signal output means.

13. The apparatus of claim 1, wherein said 3:4 pixel conversion means includes:

filtering means for delaying and filtering the video signal from said 3:4 line conversion means;

a 1:3 demultiplexer for 1:3-demultiplexing the filtered video signal from said filtering means; and a 4:1 multiplexer for 4:1-multiplexing the delayed video signal from said filtering means and output signals from said 1:3 demultiplexer.

14. The apparatus of claim 13, wherein said filtering means includes:

a latch for storing and delaying the video signal from said 3:4 line conversion means in pixel units and outputting the delayed video signal to said 4:1 multiplexer;

an adder for adding an output signal from said latch to the video signal from said 3:4 line conversion means; and a divider for dividing an output signal from said adder by 2 to obtain an average of adjacent pixels of the video signal from said 3:4 line conversion means and outputting the divided signal to said 1:3 demultiplexer.

15. The apparatus of claim 1, wherein said 3:4 line conversion means includes:

coefficient generation means for generating first and second filtering coefficients in response to a synchronous signal and an input line clock for controlling input timing of the video signal;

filtering means for filtering the output video signal from said scanning format conversion means using a weighted average in consideration of a relative position of an output line with respect to an input line in response to the first and second filtering coefficients from said coefficient generation means; and signal output means for selectively outputting a plurality of output signals from said filtering means.

16. The apparatus of claim 15, wherein said coefficient generation means includes:

a line counter for counting the input line clock in 2 bit units in response to the synchronous signal;

a first multiplexer for selecting one of first, second and third input coefficients in response to first and second output bits from said line counter and outputting a selected input coefficient as the first filtering coefficient to said filtering means; and a second multiplexer for selecting one of fourth, fifth and sixth input coefficients in response to the first and second output bits from said line counter and outputting a selected input coefficient as the second filtering coefficient to said filtering means.

17. The apparatus of claim 16, wherein said line counter is reset upon receiving three of the input line clocks.

18. The apparatus of claim 16, wherein said filtering means includes:

a line memory for storing and delaying the video signal from said scanning format conversion means in line units;

a first multiplier for multiplying an output signal from said line memory by the first filtering coefficient from said first multiplexer in said coefficient generation means;

a second multiplier for multiplying the video signal from said scanning format conversion means by the second filtering coefficient from said second multiplexer in said coefficient generation means; and an adder for adding output signals from said first and second multipliers and outputting the added signal to said signal output means.

19. The apparatus of claim 18, wherein said signal output means includes:

a first FIFO memory for storing temporarily the output signal from said line memory in said filtering means;

a second FIFO memory for storing temporarily an output signal from said adder in said filtering means;

a third multiplexer for selecting one of output signals from said first and second FIFO memories; and output control means for controlling said first and second FIFO memories and said third-multiplexer in response to the input line clock.

20. The apparatus of claim 16, wherein a sum of the first and second filtering coefficients from said first and second multiplexers is 1.

21. The apparatus of claim 19, wherein said output control means includes:

a 2-bit counter for counting the input line clock in the 2 bit units; and an OR gate for performing a logical OR operation or first and second output bits from said 2-bit counter.

22. The apparatus of claim 1, wherein said 3:4 line conversion means includes:

a line memory for storing and delaying the video signal from said scanning format conversion means in line units;

weighted average calculation means for calculating a weighted average in consideration of a relative position of an output line with respect to an input line in response to the video signal from said scanning format conversion means and an output signal from said line memory;

a line counter for counting an input line clock for controlling input timing of the video signal in 2 bit units in response to a synchronous signal and controlling said weighted average calculation means in accordance with a counted result; and signal output means for selectively outputting the output signal from said line memory and an output signal from said weighted average calculation means.

23. The apparatus of claim 22, wherein said weighted average calculation means includes:

a first 4-divider for dividing the video signal from said scanning format conversion means by 4;

a first 2-divider for dividing the video signal from said scanning format conversion means by 2;

a first adder for adding output signals from said first 4-divider and said first 2-divider;

a first multiplexer for selecting one of the output signals from said first 4-divider and said first 2-divider and an output signal from said first adder under the control of said line counter;

a second 4-divider for dividing the output signal from said line memory by 4;

a second 2-divider for dividing the output signal from said line memory by 2;

a second adder for adding output signals from said second 4-divider and said second 2-divider;

a second multiplexer for selecting one of the output signals from said second 4-divider and said second 2-divider and an output signal from said second adder under the control of said line counter; and a third adder for adding output signals from said first and second multiplexers and outputting the added signal to said signal output means.

24. The apparatus of claim 23, wherein said signal output means includes:

a first FIFO memory for storing temporarily the output signal from said line memory;

a second FIFO memory for storing temporarily an output signal from said third adder in said weighted average calculation means;

a third multiplexer for selecting one of output signals from said first and second FIFO memories; and output control means for controlling said first and second FIFO memories and said third multiplexer in response to the input line clock.

25. The apparatus of claim 23, wherein said first and second multiplexers sequentially select the output signals from said first 4-divider and said second adder, the output signals from said first 2-divider and said second 2-divider, and the output signals from said first adder and said second 4-divider under the control of said line counter.

26. The apparatus of claim 22, wherein said line counter is reset upon receiving three of the input line clocks.

27. The apparatus of claim 24, wherein said output control means includes:

a 2-bit counter for counting the input line clock in the 2 bit units; and an OR gate for performing a logical OR operation or first and second output bits from said 2-bit counter.

28. The apparatus of claim 1, wherein said 3:4 pixel conversion means includes:

coefficient generation means for generating first and second filtering coefficients in response to a synchronous signal and an input sample clock for controlling input timing of the video signal;

filtering means for filtering the video signal from said 3:4 line conversion means using a weighted average in consideration of a relative position of an output pixel with respect to an input pixel in response to the first and second filtering coefficients from said coefficient generation means; and signal output means for selectively outputting a plurality of output signals from said filtering means.

29. The apparatus of claim 28, wherein said coefficient generation means includes:

a 2-bit counter for counting the input sample clock in 2 bit units in response to the synchronous signal;

a first multiplexer for selecting one of first, second and third input coefficients in response to first and second output bits from said 2-bit counter and outputting a selected input coefficient as the first filtering coefficient to said filtering means; and a second multiplexer for selecting one of fourth, fifth and sixth input coefficients in response to the first and second output bits from said 2-bit counter and outputting a selected input coefficient as the second filtering coefficient to said filtering means.

30. The apparatus of claim 29, wherein said filtering means includes:

a first latch for storing and delaying the video signal from said 3:4 line conversion means in pixel units;

a first multiplier for multiplying an output signal from said first latch by the first filtering coefficient from said first multiplexer in said coefficient generation means;

a second multiplier for multiplying the video signal from said 3:4 line conversion means by the second filtering coefficient from said second multiplexer in said coefficient generation means; and an adder for adding output signals from said first and second multipliers and outputting the added signal to said signal output means.

31. The apparatus of claim 30, wherein said signal output means includes:

a second latch for storing temporarily and delaying the output signal from said first latch in said filtering means;

a 1:3 demultiplexer for 1:3-demultiplexing an output signal from said adder in said filtering means;

a third latch for storing temporarily and delaying an output signal from said second latch;

a fourth latch for storing temporarily and delaying a first output signal from said 1:3 demultiplexer;

a fifth latch for storing temporarily and delaying a second output signal from said 1:3 demultiplexer;

a sixth latch for storing temporarily and delaying an output signal from said fourth latch; and a 4:1 multiplexer for selectively outputting output signals from said third latch, said fifth latch and said sixth latch and a third output signal from said 1:3 demultiplexer.

32. The apparatus of claim 29, wherein a sum of the first and second filtering coefficients from said first and second multiplexers is 1.

33. The apparatus of claim 1, wherein said 4:3 line conversion means includes:

filtering means for delaying and filtering the video signal from said scanning format conversion means;

signal output means for selectively outputting a plurality of output signals from said filtering means; and output control means for controlling said signal output means in response to input and output line clocks for controlling input and output timings of the video signal.

34. The apparatus of claim 33, wherein said filtering means includes:

a line memory for storing and delaying the video signal from said scanning format conversion means in line units and outputting the delayed video signal to said signal output means;

an adder for adding an output signal from said line memory to the video signal from said scanning format conversion means; and a divider for dividing an output signal from said adder by 2 to obtain an average of pixels in the same positions of adjacent lines of the video signal from said scanning format conversion means and outputting the divided signal to said signal output means.

35. The apparatus of claim 34, wherein said signal output means includes:

a first FIFO memory for storing temporarily the output signal from said line memory in said filtering means;

a second FIFO memory for storing temporarily an output signal from said divider in said filtering means; and a multiplexer for outputting selectively output signals from said first and second FIFO memories.

36. The apparatus of claim 35, wherein said output control means includes:

a first line counter for counting the input line clock in 2 bit units;

a second line counter for counting the output line clock in 2 bit units;

a first NOT gate for inverting a first output bit from said first line counter;

a NOR gate for performing a logical NOR operation on an output signal from said first NOT gate and a second output bit from said first line counter and outputting the NORed signal to said second FIFO memory in said signal output means for controlling a write operation thereof;

a latch for storing temporarily the second output bit from said first line counter for controlling a write operation of said first FIFO memory in said signal output means;

a second NOT gate for inverting a first output bit from said second line counter;

an OR gate for performing a logical OR operation on an output signal from said second NOT gate and a second output bit from said second line counter and outputting the ORed signal to said first FIFO memory for controlling a read operation thereof; and a third NOT gate for inverting an output signal from said OR gate and outputting the inverted signal to said second FIFO memory for controlling a read operation thereof.

37. The apparatus of claim 1, wherein said 4:3 pixel conversion means includes:

filtering means for delaying and filtering the video signal from said 4:3 line conversion means;

a first 1:4 demultiplexer for 1:4-demultiplexing the delayed video signal from said filtering means;

a second 1:4 demultiplexer for 1:4-demultiplexing the filtered video signal from said filtering means; and a 3:1 multiplexer for 3:1-multiplexing output signals from said first and second 1:4 demultiplexers.

38. The apparatus of claim 37, wherein said filtering means includes:

a latch for storing and delaying the video signal from said 4:3 line conversion means in pixel units and outputting the delayed video signal to said first 1:4 demultiplexer;

an adder for adding an output signal from said latch to the video signal from said 4:3 line conversion means; and a divider for dividing an output signal from said adder by 2 to obtain an average of adjacent pixels of the video signal from said 4:3 line conversion means and outputting the divided signal to said second 1:4 demultiplexer.

39. The apparatus of claim 1, wherein said 4:3 line conversion means includes:

coefficient generation means for generating first and second filtering coefficients in response to a synchronous signal and an input line clock for controlling input timing of the video signal;

filtering means for filtering the video signal from said scanning format conversion means using a weighted average in consideration of a relative position of an output line with respect to an input line in response to the first and second filtering coefficients from said coefficient generation means; and signal output means for selectively outputting an output signal from said filtering means.

40. The apparatus of claim 39, wherein said coefficient generation means includes:

a line counter for counting the input line clock in 2 bit units in response to the synchronous signal;

a first multiplexer for selecting one of first, second, third and fourth input coefficients in response to first and second output bits from said line counter and outputting a selected input coefficient as the first filtering coefficient to said filtering means; and a second multiplexer for selecting one of fifth, sixth, seventh and eighth input coefficients in response to the first and second output bits from said line counter and outputting a selected input coefficient as the second filtering coefficient to said filtering means.

41. The apparatus of claim 40, wherein said filtering means includes:

a line memory for storing and delaying the video signal from said scanning format conversion means in line units;

a first multiplier for multiplying an output signal from said line memory by the first filtering coefficient from said first multiplexer in said coefficient generation means;

a second multiplier for multiplying the video signal from said scanning format conversion means by the second filtering coefficient from said second multiplexer in said coefficient generation means; and an adder for adding output signals from said first and second multipliers and outputting the added signal to said signal output means.

42. The apparatus of claim 39, wherein said signal output means includes:

an FIFO memory for storing temporarily the output signal from said filtering means; and output control means for controlling a write operation of said FIFO memory in response to the input line clock.

43. The apparatus of claim 40, wherein a sum of the first and second filtering coefficients from said first and second multiplexers is 1.

44. The apparatus of claim 42, wherein said output control means includes:

a 2-bit counter for counting the input line clock in 2 bit units;

a first NOT gate for inverting a first output bit from said 2-bit counter;

a second NOT gate for inverting a second output bit from said 2-bit counter; and an OR gate for performing a logical OR operation on output signals from said first and second NOT gates and outputting the ORed signal to said FIFO memory for controlling the write operation thereof.

45. The apparatus of claim 1, wherein said 4:3 line conversion means includes:

a line memory for storing and delaying the video signal from said scanning format conversion line;

weighted average calculation means for calculating a weighted average in consideration of a relative position of an output line with respect to an input line in response to the video signal from said scanning format conversion means and an output signal from said line memory;

a line counter for counting an input line clock for controlling input timing of the video signal in 2 bit units in response to a synchronous signal and controlling said weighted average calculation means in accordance with the counted result; and signal output means for selectively outputting an output signal from said weighted average calculation means.

46. The apparatus of claim 45, wherein said weighted average calculation means includes:

a first 16-divider for dividing the video signal from said scanning format conversion means by 16;

a first 4-divider for dividing the video signal from said scanning format conversion means by 4;

a first 2-divider for dividing the video signal from said scanning format conversion means by 2;

a first adder for adding output signals from said first 4-divider and said first 2-divider;

a second adder for adding an output signal from said first 16-divider and the output signal from said first 4-divider;

a first subtracter for obtaining a difference between an output signal from said first adder and the output signal from said first 16-divider;

a first multiplexer for selecting one of the video signal from said scanning format conversion means, output signals from said second adder and said first subtracter, and a ground signal under the control of said line counter;

a second 16-divider for dividing the output signal from said line memory by 16;

a second 4-divider for dividing the output signal from said line memory by 4;

a second 2-divider for dividing the output signal from said line memory by 2;

a third adder for adding output signals from said second 4-divider and said second 2-divider;

a fourth adder for adding an output signal from said second 16-divider and the output signal from said second 4-divider;

a second subtracter for obtaining a difference between an output signal from said third adder and the output signal from said second 16-divider;

a second multiplexer for selecting one of the output signal from said line memory, output signals from said fourth adder and said second subtracter, and the ground signal under the control of said line counter; and a fifth adder for adding output signals from said first and second multiplexers and outputting the added signal to said signal output means.

47. The apparatus of claim 45, wherein said signal output means includes:

an FIFO memory for storing temporarily the output signal from said weighted average calculation means; and output control means for controlling a write operation of said FIFO memory in response to the input line clock.

48. The apparatus of claim 46, wherein said first and second multiplexers sequentially select the ground signal and the output signal from said line memory, the output signals from said first subtracter and said fourth adder, the output signals from said second adder and said second subtracter, and the video signal from said scanning format conversion means and the ground signal under the control of said line counter.

49. The apparatus of claim 47, wherein said output control means includes:

a 2-bit counter for counting the input line clock in the 2 bit units;

a first NOT gate for inverting a first output bit from said 2-bit counter;

a second NOT gate for inverting a second output bit from said 2-bit counter; and an OR gate for preforming a logical OR operation on output signals from said first and second NOT gates and outputting the ORed signal to said FIFO memory for controlling the read operation thereof.

50. The apparatus of claim 1, wherein said 4:3 pixel conversion means includes:

coefficient generation means for generating first and second filtering coefficients in response to a synchronous signal and an input sample clock for controlling input timing of the video signal;

filtering means for filtering the video signal from said 4:3 line conversion means using a weighted average in consideration of a relative position of an output pixel with respect to an input pixel in response to the first and second filtering coefficients from said coefficient generation means; and signal output means for selectively outputting an output signal from said filtering means in response to the input sample clock and an output sample clock for controlling output timing of the video signal.

51. The apparatus of claim 50 wherein said coefficient generation means includes:

a 2-bit counter for counting the input sample clock in 2 bit units in response to the synchronous signal;

a first multiplexer for selecting one of first, second, third and fourth input coefficients in response to first and second output bits from said 2-bit counter and outputting a selected input coefficient as the first filtering coefficient to said filtering means; and a second multiplexer for selecting one of fifth, sixth, seventh and eighth input coefficients in response to the first and second output bits from said 2-bit counter and outputting a selected input coefficient as the second filtering coefficient to said filtering means.

52. The apparatus of claim 51, wherein said filtering means includes:

a latch for storing and delaying the video signal from said 4:3 line conversion means in pixel units;

a first multiplier for multiplying an output signal from said latch by the first filtering coefficient from said first multiplexer in said coefficient generation means;

a second multiplier for multiplying the video signal from said 4:3 line conversion means by the second filtering coefficient from said second multiplexer in said coefficient generation means; and an adder for adding output signals from said first and second multipliers and outputting the added signal to said signal output means.

53. The apparatus of claim 50, wherein said signal output means includes:

a 1:4 demultiplexer for 1:4-demultiplexing the output signal from said filtering means;

a 4:1 multiplexer for 4:1-multiplexing output signals from said 1:4 demultiplexer; and output control means for controlling said 1:4 demultiplexer and said 4:1 multiplexer in response to the input sample clock and the output sample clock.

54. The apparatus of claim 51, wherein a sum of the first and second filtering coefficients from said first and second multiplexers is 1.

55. The apparatus of claim 53, wherein said output control means includes:

a first 2-bit counter for counting the input sample clock in the 2 bit units and providing first and second output bits to control said 1:4 demultiplexer in accordance with the counted result;

a second 2-bit counter for counting the output sample clock in the 2 bit units and providing third and fourth output bits to control said 4:1 multiplexer in accordance with the counted result;

a NOT gate for inverting the third output bit from said second 2-bit counter; and an AND gate for performing a logical AND operation on the third output bit from said second 2-bit counter and an output signal from said NOT gate and outputting the ANDed signal to said second 2-bit counter to control the second 2-bit counter.

56. The apparatus of claim 1, wherein said 2:1 line conversion means includes:

filtering means for delaying and filtering the video signal from said scanning format conversion means;

an FIFO memory for storing temporarily an output signal from said filtering means; and output control means for controlling said FIFO memory in response to an input line clock for controlling input timing of the video signal.

57. The apparatus of claim 56, wherein said filtering means includes:

a line memory for storing and delaying the video signal from said scanning format conversion means in line units;

an adder for adding an output signal from said line memory to the video signal from said scanning format conversion means; and a divider for dividing an output signal from said adder by 2 to obtain an average of pixels in the same positions of adjacent lines of the video signal from said scanning format conversion means and outputting the divided signal to said FIFO memory.

58. The apparatus of claim 56, wherein said output control means includes:

a line counter for counting the input line clock in 2 bit units and outputting two output bits; and a NOT gate for inverting a first one of the two output bits from said line counter and outputting the inverted signal to said FIFO memory for controlling a write operation thereof.

59. The apparatus of claim 1, wherein said 2:1 pixel conversion means includes:

filtering means for delaying and filtering the video signal from said 2:1 line conversion means; and a 1:2 demultiplexer for 1:2-demultiplexing an output signal from said filtering means.

60. The apparatus of claim 59, wherein said filtering means includes:

a latch for storing and delaying the video signal from said 2:1 line conversion means in pixel units;

an adder for adding an output signal from said latch to the video signal from said 2:1 line conversion means; and a divider for dividing an output signal from said adder by 2 to obtain an average of adjacent pixels of the video signal from said 2:1 line conversion means and outputting the divided signal to said 1:2 demultiplexer.

61. The apparatus of claim 1, wherein said 3:2 line conversion means includes:

filtering means for delaying and filtering the video signal from said scanning format conversion means;

an FIFO memory for storing temporarily an output signal from said filtering means; and output control means for controlling said FIFO memory in response to an input line clock for controlling input timing of the video signal.

62. The apparatus of claim 61, wherein said filtering means includes:

a line memory for storing and delaying the video signal from said scanning format conversion means in line units;

an adder for adding an output signal from said line memory to the video signal from said scanning format conversion means; and a divider for dividing an output signal from said adder by 2 to obtain an average of pixels in the same positions of adjacent lines of the video signal from said scanning format conversion means and outputting the divided signal to said FIFO memory.

63. The apparatus of claim 61, wherein said output control means includes:

a line counter for counting the input line clock in 2 bit units and outputting first and second output bits;

a NOT gate for inverting the first output bit from said line counter and outputting the inverted signal to said FIFO memory for controlling a write operation thereof; and an AND gate for performing a logical AND operation on the second output bit from said line counter and an output signal from said NOT gate and outputting the ANDed signal to said line counter to control the line counter.

64. The apparatus of claim 1, wherein said 3:2 pixel conversion means includes:

filtering means for delaying and filtering the video signal from said 3:2 line conversion means;

a first 1:3 demultiplexer for 1:3-demultiplexing the delayed video signal from said filtering means;

a second 1:3 demultiplexer for 1:3-demultiplexing the filtered video signal from said filtering means; and a 2:1 multiplexer for 2:1-multiplexing output signals from said first and second 1:3 demultiplexers.

65. The apparatus of claim 64, wherein said filtering means includes:

a latch for storing and delaying the video signal from said 3:2 line conversion means in pixel units and outputting the delayed video signal to said first 1:3 demultiplexer;

an adder for adding an output signal from said latch to the video signal from said 3:2 line conversion means; and a divider for dividing an output signal from said adder by 2 to obtain an average of adjacent pixels of the video signal from said 3:2 line conversion means and outputting the divided signal to said second 1:3 demultiplexer.

* * * * *